United States Patent
Jada et al.

(10) Patent No.: US 11,868,467 B2
(45) Date of Patent: Jan. 9, 2024

(54) SEMICONDUCTOR DEVICE, CONTROL FLOW INSPECTION METHOD, NON-TRANSITORY COMPUTER READABLE MEDIUM, AND ELECTRONIC DEVICE

(71) Applicant: NEC Corporation, Tokyo (JP)

(72) Inventors: Astha Jada, Tokyo (JP); Toshiki Kobayashi, Tokyo (JP); Takayuki Sasaki, Tokyo (JP); Daniele Enrico Asoni, Zurich (CH); Adrian Perrig, Zurich (CH)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 17/620,804

(22) PCT Filed: Jun. 25, 2019

(86) PCT No.: PCT/JP2019/025100
§ 371 (c)(1),
(2) Date: Dec. 20, 2021

(87) PCT Pub. No.: WO2020/261365
PCT Pub. Date: Dec. 30, 2020

(65) Prior Publication Data
US 2022/0358211 A1    Nov. 10, 2022

(51) Int. Cl.
*G06F 21/54* (2013.01)
*G06F 21/53* (2013.01)

(52) U.S. Cl.
CPC .............. *G06F 21/54* (2013.01); *G06F 21/53* (2013.01)

(58) Field of Classification Search
CPC .......... G06F 21/54; G06F 21/53; G06F 21/565
See application file for complete search history.

(56) References Cited

U.S. PATENT DOCUMENTS

| | | | |
|---|---|---|---|
| 2018/0225446 A1* | 8/2018 | Liu | G06F 21/577 |
| 2018/0260564 A1 | 9/2018 | Porteboeuf | |
| 2019/0005232 A1* | 1/2019 | Ando | G06F 21/52 |
| 2019/0007446 A1* | 1/2019 | Ando | H04L 9/002 |

FOREIGN PATENT DOCUMENTS

| | | |
|---|---|---|
| EP | 3373178 A1 | 9/2018 |
| JP | 2019-012498 A | 1/2019 |

OTHER PUBLICATIONS

International Search Report for PCT Application No. PCT/JP2019/025100, dated Sep. 10, 2019.

* cited by examiner

*Primary Examiner* — Trong H Nguyen

(57) ABSTRACT

A semiconductor device (100) includes: a determination unit (110) configured to determine whether an avoidance condition of inspection of control flow integrity is satisfied (e.g., a degree of similarity with a previous input value is in a predetermined range) based on determination auxiliary information, which is at least an input value in a target code block to be executed among a plurality of code blocks in a predetermined program, and an inspection unit (120) configured to avoid inspection of control flow integrity in the target code block when it is determined that the avoidance condition is satisfied.

12 Claims, 17 Drawing Sheets

SEMICONDUCTOR DEVICE, CONTROL FLOW INSPECTION METHOD, NON-TRANSITORY COMPUTER READABLE MEDIUM, AND ELECTRONIC DEVICE

This application is a National Stage Entry of PCT/JP2019/025100 filed on Jun. 25, 2019, the contents of all of which are incorporated herein by reference, in their entirety.

TECHNICAL FIELD

The present disclosure relates to a semiconductor device, a control flow inspection method, and a non-transitory computer readable medium storing a control flow inspection program.

BACKGROUND ART

Patent Literature 1 discloses a technique related to a circuit that monitors security of a processor. The processor disclosed in Patent Literature 1 determines one or more signatures from execution context data of a program executed by the processor and compares the signatures with predefined signatures to enhance security. Further, techniques for enhancing security when a program is executed include inspection of Control Flow Integrity (CFI).

CITATION LIST

Patent Literature

[Patent Literature 1] European Patent Application Publication No. 3373178

SUMMARY OF INVENTION

Technical Problem

When CFI inspection is performed during execution of a program to maintain device security, detailed processing is usually required, and thus overhead (net execution cost) is high. Therefore, Patent Literature 1 has a problem that it is difficult to reduce processing overhead while maintaining device security when inspection of control flow integrity is performed.

The present disclosure has been made in order to solve the aforementioned problem and the aim of the present disclosure is to provide a semiconductor device, a control flow inspection method, and a non-transitory computer readable medium storing a control flow inspection program for reducing processing overhead while maintaining device security.

Solution to Problem

A semiconductor device according to a first aspect of the present disclosure includes:

determination means for determining whether an avoidance condition of inspection of control flow integrity is satisfied based on determination auxiliary information in a target code block to be executed among a plurality of code blocks in a predetermined program; and inspection means for avoiding the inspection of the control flow integrity in the target code block when it is determined that the avoidance condition is satisfied.

In a control flow inspection method according to a second aspect of the present disclosure, a computer:

makes a determination of whether an avoidance condition of inspection of control flow integrity is satisfied based on determination auxiliary information in a target code block to be executed among a plurality of code blocks in a predetermined program; and avoids inspection of the control flow integrity in the target code block when it is determined that the avoidance condition is satisfied.

A non-transitory computer readable medium storing a control flow inspection program according to a third aspect of the present disclosure causes a computer to execute:

processing of determining whether an avoidance condition of inspection of control flow integrity is satisfied based on determination auxiliary information in a target code block to be executed among a plurality of code blocks in a predetermined program; and processing of avoiding inspection of the control flow integrity in the target code block when it is determined that the avoidance condition is satisfied.

Advantageous Effects of Invention

According to the aforementioned aspects, it is possible to provide a semiconductor device, a control flow inspection method, and a non-transitory computer readable medium storing a control flow inspection program for reducing processing overhead while maintaining device security.

DESCRIPTION OF EMBODIMENTS

Hereinafter, with reference to the drawings, example embodiments of the present disclosure will be described in detail. Throughout the drawings, the same or corresponding elements are denoted by the same symbols and overlapping descriptions will be omitted as necessary for the sake of clarification of the description.

First Example Embodiment

Figure 1:
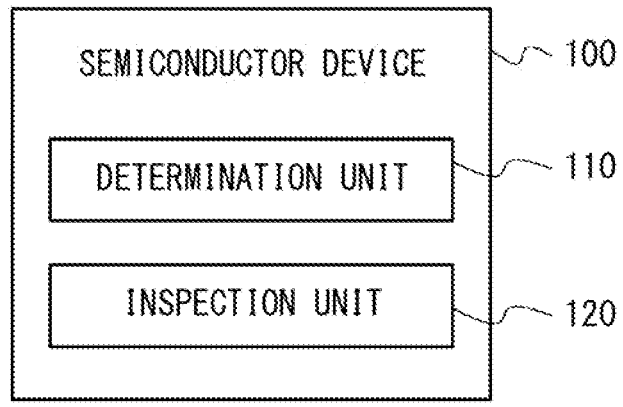
FIG. 1 is a block diagram showing a configuration of a semiconductor device according to a first example embodiment.

FIG. 1 is a block diagram showing a configuration of a semiconductor device 100 according to a first example embodiment. The semiconductor device 100 is a control apparatus or an information processing apparatus such as a processor that controls execution of a predetermined program. Further, the semiconductor device 100 may be mounted on an electronic device such as a computer or an information processing apparatus, or an Internet of Thing (IoT) device or an embedded device. The semiconductor device 100 includes a determination unit 110 and an inspection unit 120.

The determination unit 110 makes a determination of whether an avoidance condition of inspection of control flow integrity is satisfied based on determination auxiliary information in a target code block. The target code block is a code block to be executed among a plurality of code blocks in a predetermined program. Further, the determination auxiliary information is information for assisting the determination made by the determination unit 110. The determination auxiliary information includes, for example, input values to the target code block, variable values indicating an internal state of the target code block or the like. However, the determination auxiliary information is not limited thereto. Further, the avoidance condition is, for example, a degree of matching between the data content of the determination auxiliary information and a predetermined value, or that the data size of the determination auxiliary information is within a predetermined range. Further, information on the history of previous input values, results of the determination or the like may be reflected in the predetermined value and the predetermined range of the avoidance condition. The inspection unit 120 avoids inspection of the control flow integrity in the target code block when it is determined that the avoidance condition is satisfied.

Figure 2:
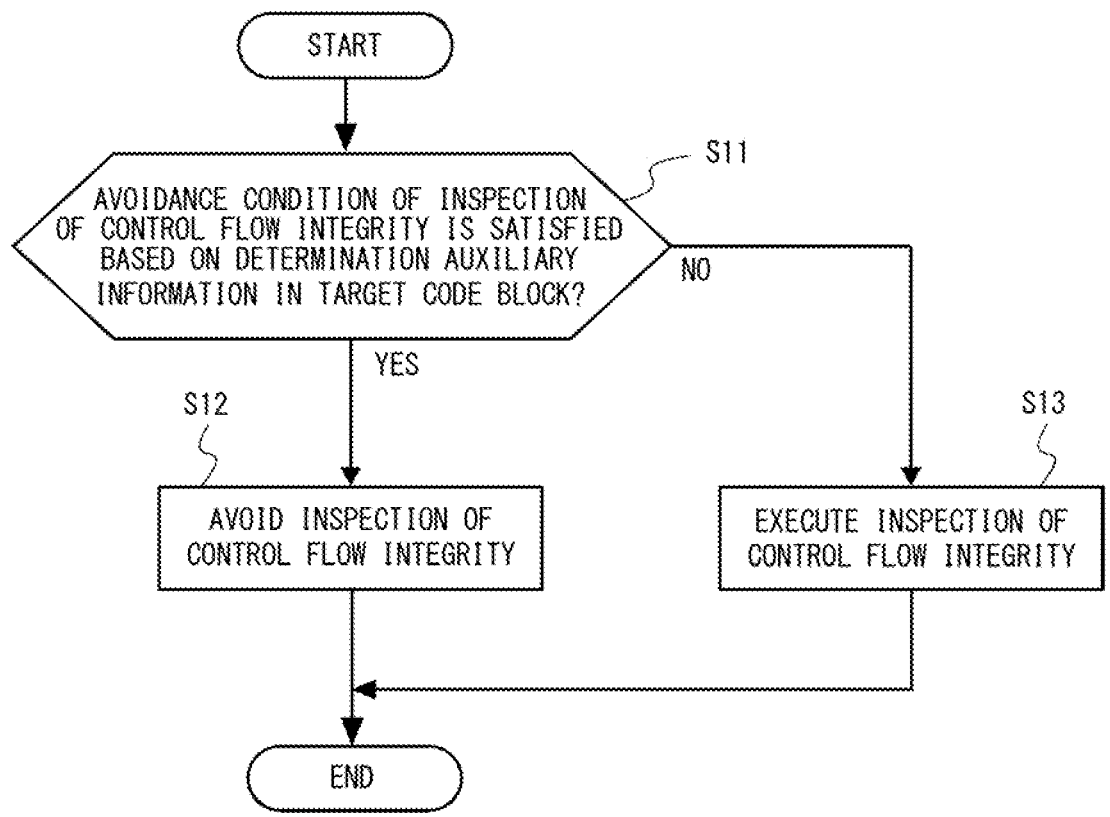
FIG. 2 is a flowchart showing a flow of a control flow inspection method according to the first example embodiment.

FIG. 2 is a flowchart showing a flow of a control flow inspection method according to the first example embodiment. First, the determination unit 110 determines whether the avoidance condition of the inspection of the control flow integrity is satisfied based on the determination auxiliary information in the target code block (S11). When it is determined that the avoidance condition is satisfied, the inspection unit 120 avoids the inspection of the control flow integrity in the target code block (S12). That is, the inspection unit 120 does not perform the inspection of the control flow integrity in the target code block. On the other hand, when it is determined that the avoidance condition is not satisfied, the inspection unit 120 executes the inspection of the control flow integrity in the target code block (S13).

As described above, according to this example embodiment, when the determination auxiliary information in the target code block satisfies a predetermined condition (e.g., when, for example, a value the same as the value last time has been input), it is assumed that safety can be ensured even when the target code block is executed. Therefore, when it is determined that safety can be ensured, the execution of the inspection processing of the control flow integrity, which has a non-negligible processing load, is avoided. That is, the number of times the inspection processing of the control flow integrity of the target code block (processing of comparing execution orders or hash values etc.) is executed can be reduced. On the other hand, when the determination auxiliary information does not satisfy the avoidance condition (e.g., when, for example, a value that is greatly different from that in a normal time is input), it is regarded that there are security concerns. In this case, inspection processing of the control flow integrity can be normally executed so that security can be maintained. Accordingly, with this example embodiment, it is possible to reduce processing overhead while maintaining device security.

Note that the semiconductor device 100 includes, as components that are not shown, a processor, a memory, and another storage apparatus. The other storage apparatus stores a computer program in which the control flow inspection method according to this example embodiment (including FIG. 2) is implemented. Then, this processor loads a computer program into the memory from the storage apparatus and executes the loaded computer program. Accordingly, the processor implements the functions of the determination unit 110 and the inspection unit 120.

Alternatively, each of the determination unit 110 and the inspection unit 120 may be implemented by dedicated hardware. Further, some or all of the components of each apparatus may be implemented by general-purpose or dedicated circuitry, processor, or a combination of them. They may be configured using a single chip, or a plurality of chips connected through a bus. Some or all of the components of each apparatus may be implemented by a combination of the above-described circuitry, etc. and a program. Further, a Central Processing Unit (CPU), a Graphics Processing Unit (GPU), a field-programmable gate array (FPGA), an ARM (registered trademark) architecture and so on may be used as a processor.

Second Example Embodiment

A second example embodiment is a specific example of the aforementioned first example embodiment.

Figure 3:
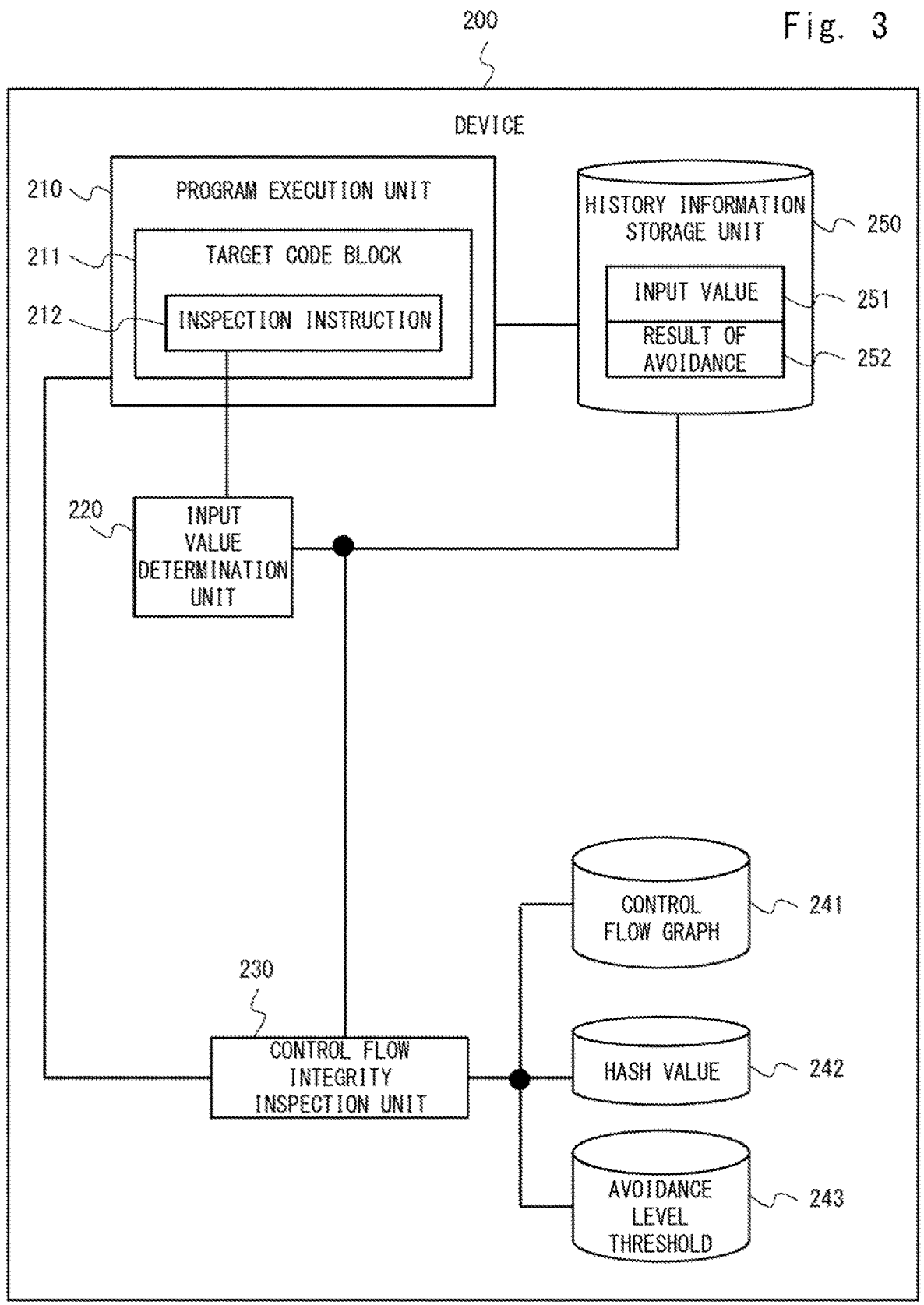
FIG. 3 is a block diagram showing a configuration of a device according to a second example embodiment.

FIG. 3 is a block diagram showing a configuration of a device 200 according to the second example embodiment. The device 200 is one example of the aforementioned semiconductor device 100. The device 200 at least includes a program execution unit 210, an input value determination unit 220, a control flow integrity inspection unit 230, a control flow graph 241, a hash value 242, an avoidance level threshold 243, and a history information storage unit 250.

The program execution unit 210 is a control apparatus that executes a target code block 211 in a predetermined program. The program execution unit 210, is, for example, but not limited to, a processor core. It is assumed here that the predetermined program is formed of one or more modules and one or more code blocks are implemented in each module. Then, each code block is, for example, a set of program codes of units such as functions. It is further assumed that an inspection instruction 212 of control flow integrity is set in a part of each code block. The inspection instruction 212, which is an instruction for calling the input value determination unit 220 and inspection processing by the control flow integrity inspection unit 230 that will be described later, is, for example, a function. A plurality of inspection instructions 212 may be set in one code block. It is assumed that the inspection instruction 212 may be set in any position in the code block, such as at the beginning, in the middle, or at the end of the code block. The inspection instruction 212 can be set between code blocks as well. This case is assumed to be equal to a case in which the inspection instruction is set in the end of the code block immediately before the inspection instruction 212 or a case in which the inspection instruction is set at the top of the code block immediately after the inspection instruction 212. The inspection instruction 212 may be implemented on a source code when the program is developed or may be inserted into a binary after compilation. An input value to the target code block 211 may be given as an argument of the inspection instruction 212. Alternatively, the input value to the target code block 211 may be separately acquired from the input value determination unit 220.

The input value determination unit 220, which is one example of the aforementioned determination unit 110, is a software process or a hardware circuit that determines input values that are acquired in accordance with calling from the inspection instruction 212 and notifies the control flow integrity inspection unit 230 of the result of the determination. The input value determination unit 220 makes the determination using the degree of similarity with an input value obtained at the time of past execution in the target code block 211 as the avoidance condition. Accordingly, when the input value is such an input value that has been actually used at the time of execution, the inspection can be avoided, the number of times of inspection processing can be reduced, and the processing overhead can be further reduced while ensuring security.

It is assumed that the determination auxiliary information includes the input values to the target code block. In this case, the input value determination unit 220 makes the determination using the data content of the input values or the range of the data size as the avoidance condition. Accordingly, in a case of an attack such as buffer overflow, the avoidance condition is not satisfied and inspection is normally performed, whereby this attack may be detected. Accordingly, high security can be maintained.

Further, the input value determination unit 220 sets, when it is determined that the avoidance condition is satisfied, an avoidance level in accordance with the degree to which the avoidance condition is satisfied. It is therefore possible to finely control execution of inspection processing.

Further, the input value determination unit 220 acquires the input values as the determination auxiliary information in the target code block. Then, the input value determination unit 220 makes a determination based on history information that will be described later and the acquired determination auxiliary information. Further, the input value determination unit 220 adds the acquired input values to the history information storage unit 250 as history information in accordance with the result of the avoidance by the control flow integrity inspection unit 230 that will be described later. It is therefore possible to cause determination of whether to avoid inspection processing to be made with a high accuracy in view of results of inspections performed and results of inspections avoided. Assume, for example, a case in which it is determined that the input values satisfy the avoidance condition and thus the result of the avoidance shows that inspection processing will be avoided by avoidance determination processing that will be described later. In this case, the input value determination unit 220 adds history information in which the result of the avoidance is associated with the input values to the history information storage unit 250. There is another case in which, even when the input values are determined to satisfy the avoidance condition, the result of the avoidance shows that inspection processing will not be avoided by the avoidance determination processing that will be described later. In this case, the input value determination unit 220 may add, besides the result of the avoidance and the result of the inspection, the input values to the history information storage unit 250 as the history information.

The Control Flow Graph (CFG) 241 is graph information that defines the result of the analysis of the control structure of the program as the flow of control between code blocks. The control flow graph 241, which is stored in a storage apparatus such as a memory in the device 200, functions as a database. The control flow graph 241 is information that defines the position and the execution order of each code block in a program, and defines a link from the code block executed first to the code block to be executed next, a link to a branch destination etc.

Figure 4:
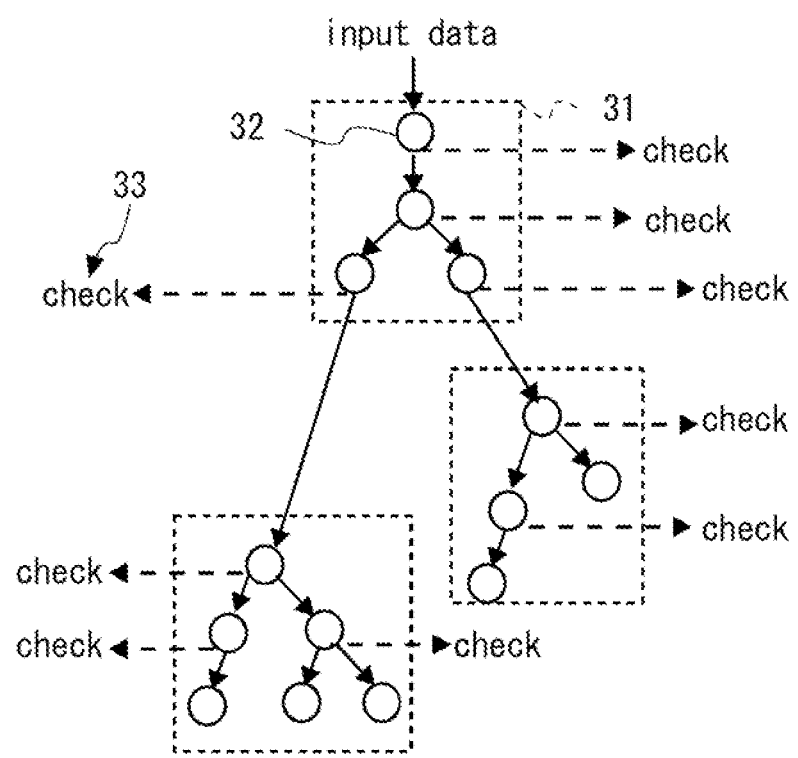
FIG. 4 is a diagram for describing a relation between a control flow graph and an inspection instruction according to the second example embodiment.

FIG. 4 is a diagram for describing a relation between the control flow graph and the inspection instruction according to the second example embodiment. A module 31, which is a set of code blocks, is, for example, a program file or the like. A code block 32, which is a set of one or more program codes, is, for example, a function or the like. Hash value inspection processing 33, which is called by execution of the inspection instruction set in the code block, conceptually indicates that it is executed when it is determined by the input value determination unit 220 that the avoidance condition is not satisfied or it is determined by avoidance determination that inspection processing cannot be avoided.

Referring once again to FIG. 3, the explanation will be continued. The hash value 242 is information used for inspection of the execution order of a plurality of code blocks in a predetermined program. In other words, the hash value 242 according to this example embodiment is information for specifying the execution order of the plurality of code blocks in the predetermined program. For example, the hash value 242 is a value calculated in advance by a predetermined hash function from numerical value information indicating the execution order of a plurality of code blocks in a predetermined program. Further, the hash value 242 may be a value calculated by a predetermined hash function from a set of the path of the control flow of two or more code blocks and the number of the execution order. For the inspection of the execution order, the execution order itself or a set of execution orders itself may be used in place of the hash value 242.

The avoidance level threshold 243 is a threshold of the avoidance level defined in advance in each of the plurality of code blocks. Note that each of the hash value 242 and the avoidance level threshold 243 is stored in a storage apparatus such as a memory in the device 200. It is assumed that the hash value 242 is associated with the execution order used at the time of calculation and is stored in the storage apparatus.

The control flow integrity inspection unit 230, which is one example of the aforementioned inspection unit 120, is a software process or a hardware circuit in which inspection processing of the hash value of the target code block in accordance with the inspection instruction is implemented. The control flow integrity inspection unit 230 performs the inspection of the control flow integrity regarding a target code block 211 that is currently being executed in the program execution unit 210 or a code block that may be executed immediately after the target code block 211. The control flow integrity inspection unit 230 sends back, when it is determined in the inspection that there is no problem, an instruction for allowing execution of the processing that is executed after the code block to the program execution unit 210. On the other hand, when it is determined in the inspection that there is a problem, the control flow integrity inspection unit 230 sends back an instruction for blocking execution of the processing that is executed after this code block to the program execution unit 210.

The control flow integrity inspection unit 230 according to this example embodiment avoids inspection in accordance with the avoidance level. Accordingly, whether or not to avoid inspection can be finely controlled. Then, the control flow integrity inspection unit 230 avoids the inspection when the avoidance level set by the input value determination unit 220 satisfies the avoidance level threshold 243 defined in the target code block. Accordingly, it is possible to make a determination of whether to avoid inspection more accurately.

The history information storage unit 250 is a storage apparatus that stores history information of the determination auxiliary information. In this example, the history information storage unit 250 stores an input value 251 in association with a result of the avoidance 252. It is further assumed that the input value 251 and the result of the avoidance 252 are also associated with the target code block. The input value 251 is an input value used for the determination in the input value determination unit 220. The result of the avoidance 252 is information indicating whether the inspection has been avoided in the control flow integrity inspection unit 230. The history information storage unit 250 may further store, besides the input value 251 and the result of the avoidance 252 associated with each other, the result of the inspection by the control flow integrity inspection unit 230 and the result of executing the target code block in association with each other.

Figure 5:
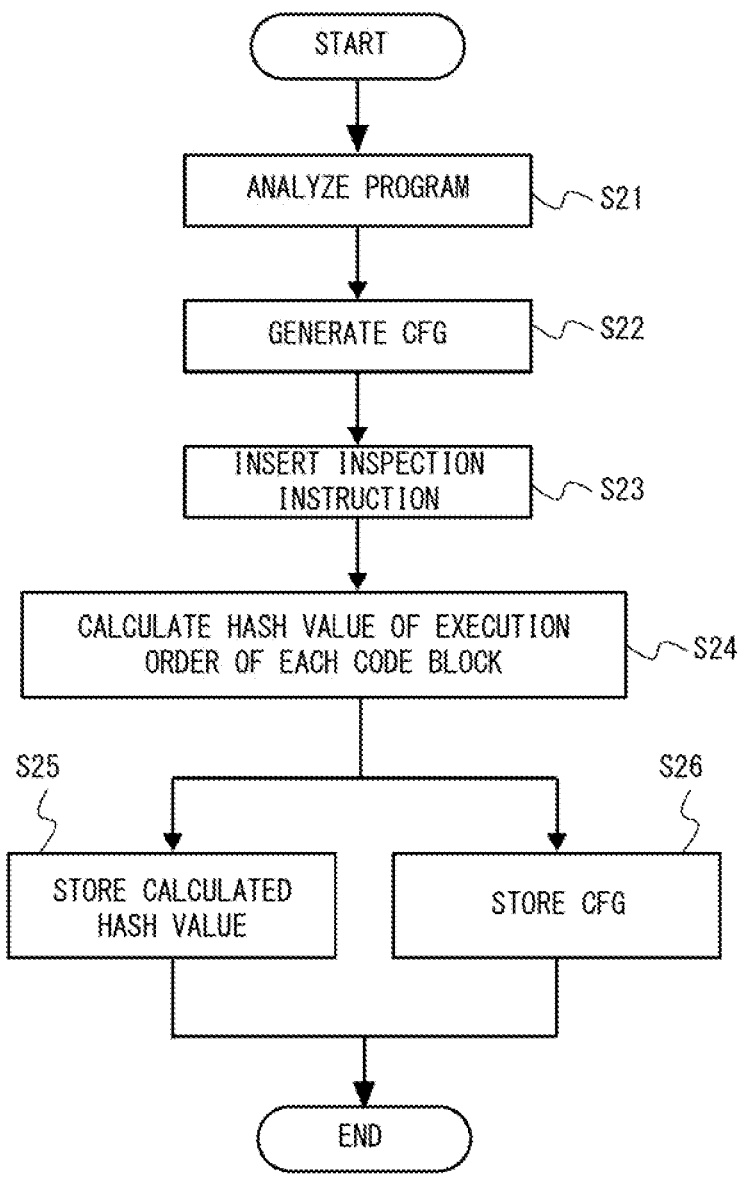
FIG. 5 is a flowchart showing a flow of preliminary processing according to the second example embodiment.

FIG. 5 is a flowchart showing a flow of preliminary processing according to the second example embodiment. The preliminary processing is processing of generating hash values and a CFG from the program to be executed and storing the generated hash values and CFG. The preliminary processing can be implemented by the device 200 or a desired information processing apparatus. It is assumed in the following description that the preliminary processing is executed by a desired information processing apparatus.

First, the information processing apparatus analyzes the program that will be executed in the device 200 (S21). Then, the information processing apparatus generates a control flow graph (CFG) of this program based on the result of the analysis (S22). Then, the information processing apparatus inserts an inspection instruction into each code block of the program based on the CFG. For example, the inspection instruction is inserted as shown in FIG. 4 described above. When the inspection instruction has already been implemented in the program to be analyzed, Step S23 may be omitted.

Next, the information processing apparatus calculates the hash value of the execution order of each code block based on the CFG (S24). For example, as described above, the information processing apparatus gives an execution order to a predetermined hash function and calculates the hash value. After that, the information processing apparatus associates the calculated hash value with the execution order and stores the associated information in a memory in the device 200 (S25). Further, the information processing apparatus stores the generated CFG in a storage apparatus (not shown) in the device 200 as the control flow graph 241.

Figure 6:
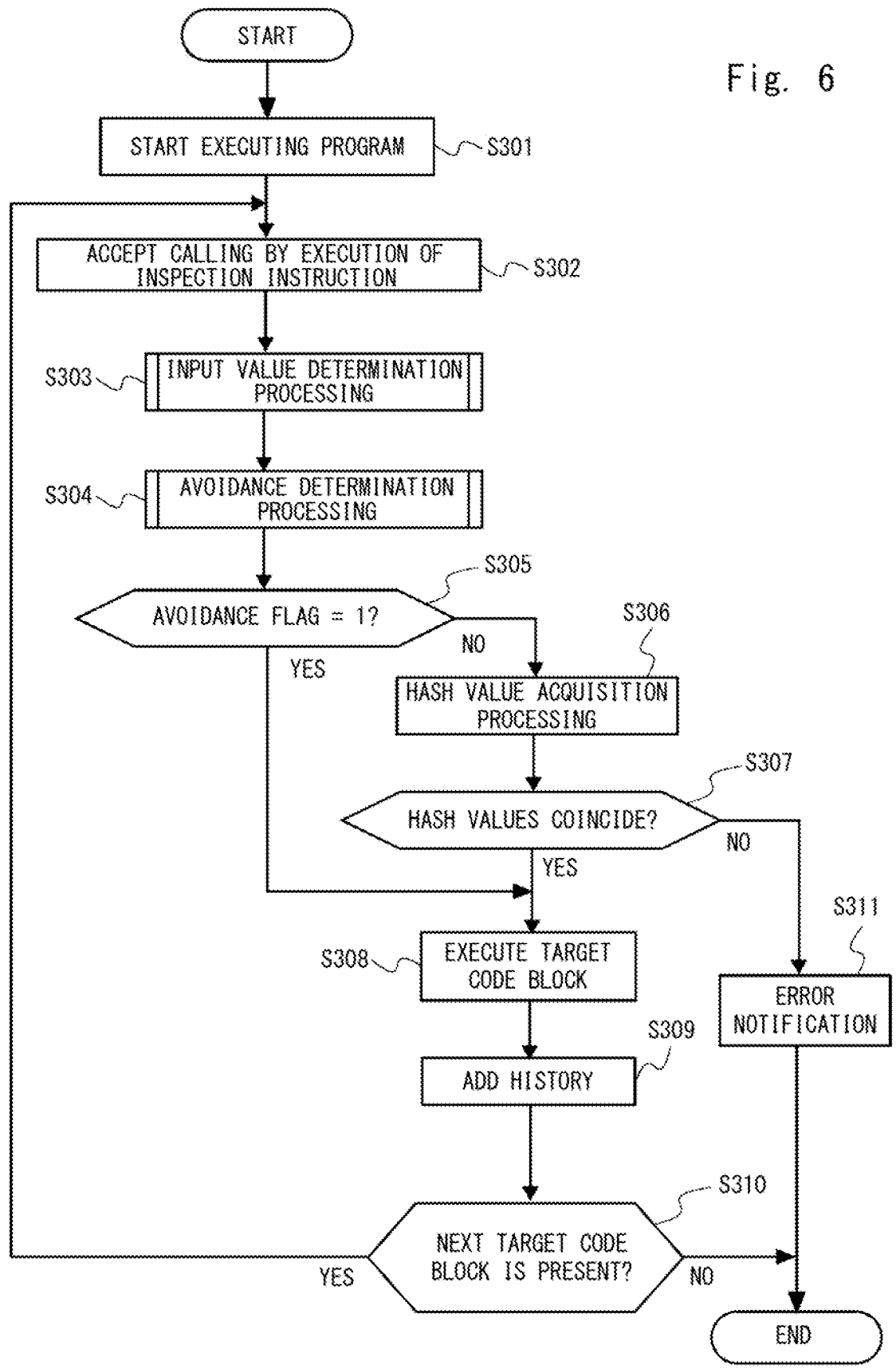
FIG. 6 is a flowchart showing a flow of a control flow inspection method according to the second example embodiment.

FIG. 6 is a flowchart showing a flow of a control flow inspection method according to the second example embodiment. In this example, a case in which control flow inspection processing is performed when a program that has created the CFG and the hash value in the above preliminary processing is executed in the device 200 will be described.

First, the program execution unit 210 starts executing the program (S301). For example, a processor core in the device 200 loads a program to be executed (externally input) into a memory (not shown) and executes the loaded program.

Next, the program execution unit 210 executes an inspection instruction during the execution of the target code block and calls the input value determination unit 220. The input value determination unit 220 accepts calling by execution of the inspection instruction (S302). Then, the input value determination unit 220 performs input value determination processing (S303).

Figure 7:
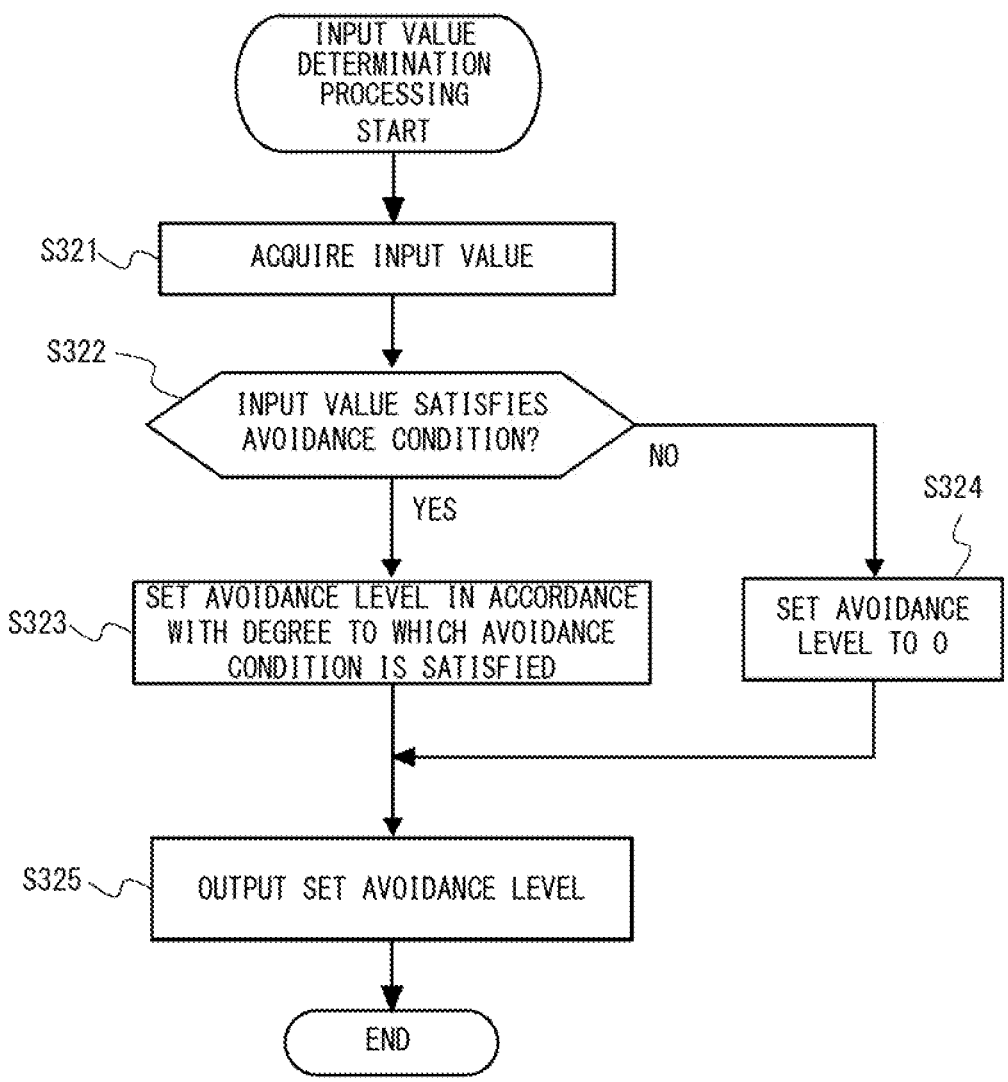
FIG. 7 is a flowchart showing a flow of input value determination processing according to the second example embodiment.

FIG. 7 is a flowchart showing a flow of input value determination processing according to the second example embodiment. First, the input value determination unit 220 acquires the input value to the target code block (S321). When, for example, the input value to the target code block is set as the argument of the inspection instruction, the input value determination unit 220 acquires the input value from the argument of the inspection instruction. Further, when the input value is not set as the argument of the inspection instruction, the input value determination unit 220 may send an inquiry to the program execution unit 210 to acquire the input value to the target code block.

Next, the input value determination unit 220 determines whether the input value satisfies the avoidance condition (S322). The avoidance condition here may be, for example, that the data content of the input value completely or partially match a predetermined value, the number of characters that match or the percentage of the number of characters that match with respect to the total number of characters when they partially match or the like. Alternatively, the avoidance condition may be, for example, that the numerical value indicated by the input value is within a predetermined range or the like. Alternatively, the avoidance condition may be, for example, that the data length of the input value matches a predetermined value, the data length is within a predetermined range, shorter than the predetermined range, equal to or larger than the predetermined range, longer than the predetermined range, etc. However, the avoidance conditions are not limited thereto. It is further assumed that the avoidance conditions are stored in a storage apparatus such as a memory (not shown) in the device 200 in advance. Further, the predetermined value may be one of the input value 251 stored in the history information storage unit 250 that corresponds to the target code block.

When it is determined in Step S322 that the avoidance condition is satisfied, the input value determination unit 220 sets the avoidance level in accordance with the degree to which the avoidance condition is satisfied (S323). When, for example, the data content of the input value completely matches a predetermined value, the input value determination unit 220 sets the avoidance level to a high level (e.g., "3"). Further, when the data content of the input value matches the predetermined value 80%, the input value determination unit 220 sets the avoidance level to an intermediate level (e.g., "2"). Further, when the data content of the input value matches the predetermined value 50%, the input value determination unit 220 sets the avoidance level to a low level (e.g., "1"). Note that the rules for setting the avoidance level are merely examples and are not limited thereto. It is further assumed that the rules for setting the avoidance level are stored in a storage apparatus such as a memory (not shown) in the device 200 in advance. That is, the input value determination unit 220 sets the avoidance level by referring to the rules for setting the avoidance level. Further, the avoidance level may not be necessarily set by three stages and may be set by at least two stages (e.g., two values).

When it is determined in Step S322 that the avoidance condition is satisfied, the input value determination unit 220 sets the avoidance level to "0" (S324). Note that null may be set or may not be set in the avoidance level.

After Step S323 or S324, the input value determination unit 220 outputs the set avoidance level to the control flow integrity inspection unit 230 (S325).

Referring once again to FIG. 6, the explanation will be continued. After the input value determination processing in Step S303, the control flow integrity inspection unit 230 performs avoidance determination processing (S304).

Figure 8:
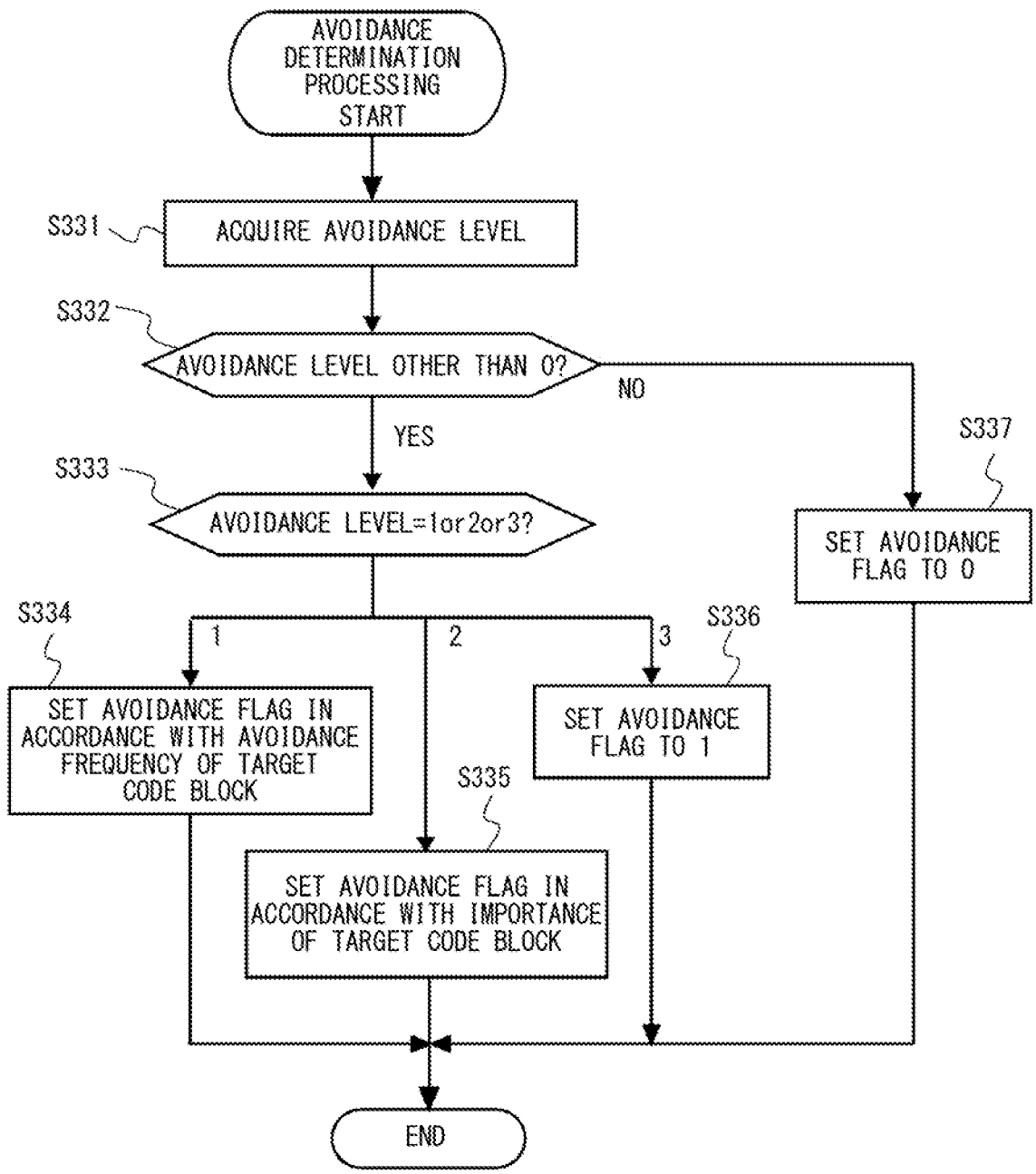
FIG. 8 is a flowchart showing a flow of avoidance determination processing according to the second example embodiment.

FIG. 8 is a flowchart showing a flow of avoidance determination processing according to the second example embodiment. First, the control flow integrity inspection unit 230 acquires the avoidance level from the input value determination unit 220 (S331). Next, the control flow integrity inspection unit 230 determines whether the acquired avoidance level is other than 0 (S332). When the acquired avoidance level is other than 0, the control flow integrity inspection unit 230 determines whether the avoidance level is 1, 2, or 3 (S333). Note that Steps S332 and S333 may be collectively performed.

When the avoidance level is 1, the control flow integrity inspection unit 230 sets the avoidance flag in accordance with the avoidance frequency of the target code block (S334). The avoidance frequency may be a value or a percentage calculated from the result of the avoidance 252 associated with the target code block. It is assumed here that the avoidance flag is a binary value of 0 or 1. When, for example, the avoidance frequency of the target code block is equal to or larger than a predetermined value, the control flow integrity inspection unit 230 sets the avoidance flag to 1. On the other hand, when the avoidance frequency of the target code block is smaller than the predetermined value, the control flow integrity inspection unit 230 sets the avoidance flag to 0.

When the avoidance level is 2, the control flow integrity inspection unit 230 sets the avoidance flag in accordance with the importance of the target code block (S335). The importance is information indicating the importance of the code block in terms of the security. When the importance of the target code block is smaller than the predetermined value, the control flow integrity inspection unit 230 sets the avoidance flag to 1. On the other hand, when the importance of the target code block is equal to or larger than the predetermined value, the control flow integrity inspection unit 230 sets the avoidance flag to 0. That is, high security can be maintained by not avoiding inspection processing of more important code blocks as much as possible.

Alternatively, when the priority of the execution order of the code blocks (e.g., there are strict restrictions on a processing time) is set in advance, the control flow integrity inspection unit 230 may set an avoidance flag in accordance with the priority. When, for example, the priority is equal to or larger than a predetermined value, the control flow integrity inspection unit 230 sets the avoidance flag to 1. On the other hand, when the priority is smaller than the predetermined value, the control flow integrity inspection unit 230 sets the avoidance flag to 0. That is, inspection of code blocks with high priority can be avoided so that the restrictions on the processing time may be overcome.

An avoidance level threshold 243 associated for each target code block may be used for the importance or the priority of the aforementioned target code blocks. Further, the avoidance level threshold 243 may be updated based on the avoidance frequency.

When the avoidance level is 3, the control flow integrity inspection unit 230 sets the avoidance flag to 1 (S336).

When the avoidance level acquired in Step S332 is 0, the control flow integrity inspection unit 230 sets the avoidance flag to 0 (S337).

Note that the aforementioned determination conditions of the avoidance level are merely examples, and not limited thereto. It is further assumed that the determination conditions of the avoidance level are stored in a storage apparatus such as a memory (not shown) in the device 200 in advance. That is, the control flow integrity inspection unit 230 sets the avoidance flag by referring to the determination condition of the avoidance level.

Referring once again to FIG. 6, the explanation will be continued. The control flow integrity inspection unit 230 determines whether the avoidance flag is 1 (S305). When the avoidance flag is other than 1, the control flow integrity inspection unit 230 performs hash value acquisition processing (S306). For example, the control flow integrity inspection unit 230 acquires the current execution order of the target code block from the program execution unit 210 and calculates a hash value using the execution order. It is assumed there that the way of calculating the hash value, the hash function to be used, etc. are similar to those in the preliminary processing (Step S24). Further, the control flow integrity inspection unit 230 acquires the hash value 242 associated with the current execution order independently of the calculation of the hash value.

Then, the control flow integrity inspection unit 230 determines whether the calculated hash value matches the acquired hash value (S307). When it is determined that the hash values match each other, the control flow integrity inspection unit 230 outputs an instruction for allowing the execution of the target code block to the program execution unit 210. Then, the program execution unit 210 executes the target code block (S308). Then, the input value determination unit 220 stores the acquired input value 251 and the result of the avoidance 252 in the control flow integrity inspection unit 230 in the history information storage unit 250. That is, the input value determination unit 220 adds the history (S309). Further, the input value determination unit 220 may store, as history information, the result of the inspection in association with the result of executing the target code block in the history information storage unit 250 along with the input value 251 and the result of the avoidance 252. Further, in place of the input value determination unit 220, the program execution unit 210 or the input value determination unit 220 may store the history information in the history information storage unit 250.

Note that, in place of the hash value 242, the execution order itself or a set of execution orders itself may be used for the inspection of the control flow integrity. Specifically, the current execution order of the target code block is compared with a pattern of a list of execution orders recorded in advance. Then, when the current execution order is in the above pattern, it is regarded as normal and execution of the program is allowed.

After that, the program execution unit 210 determines whether the next target code block is present (S310). When the next target code block is present, the program execution unit 210 calls the input value determination unit 220 again when it executes the inspection instruction, the process then proceeds to Step S302, and the following process is repeatedly executed. When it is determined in Step S310 that the next target code block is not present, the execution of the program is ended.

On the other hand, when it is determined in Step S307 that the hash values do not match each other, the control flow integrity inspection unit 230 outputs an instruction for not allowing the execution of the target code block (error notification) to the program execution unit 210 (S311). Then, the execution of the program is ended.

In this example embodiment, the avoidance determination processing in Step S304 may be omitted by setting the avoidance flag in the input value determination processing.

Figure 9:
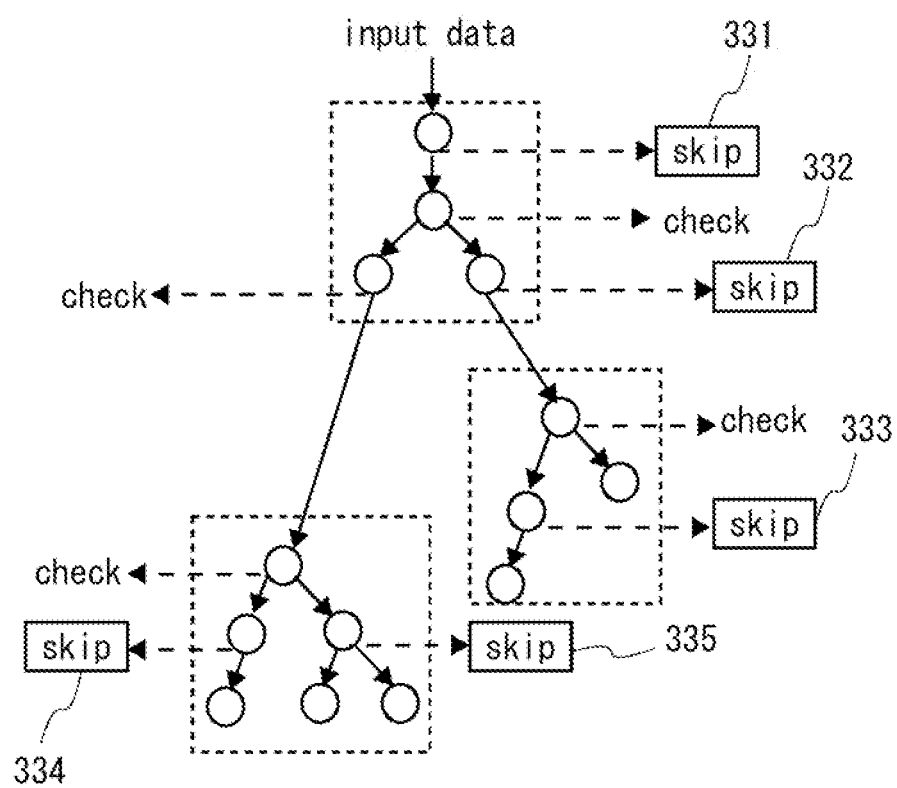
FIG. 9 is a diagram for describing the concept of avoidance of inspection processing of control flow integrity according to the second example embodiment.

FIG. 9 is a diagram for describing the concept of avoidance of the inspection processing of the control flow integrity according to the second example embodiment. FIG. 9 conceptually shows that the inspection processing of the hash value has been avoided in parts of avoidances 331, 332, 333, 334, and 335 in response to calling of the inspection instruction in each code block. As a matter of course, the parts where the processing is avoided and the number of avoidances are not limited to them.

As described above, the input value to the target code block is determined according to this example embodiment. This allows inspection to be definitely performed in the case of, for example, buffer overflow or the like, and inspection to be avoided when the degree of similarity with a previous input value is high so that the processing speed can be improved. In particular, by using history information including input values in each code block and information related to the input values, the accuracy of determining whether the avoidance condition is satisfied can be improved. Further, by making a final determination of whether to avoid inspection in avoidance determination processing (by using an avoidance flag) after the avoidance level is set in the input value determination processing, avoidance of inspection can be finely controlled. According to this procedure as well, it is possible to reduce processing overhead while maintaining device security.

Third Example Embodiment

A third example embodiment is a modified example of the aforementioned first example embodiment. Determination auxiliary information according to the third example embodiment further includes internal state variable values when the target code block is executed. Then, the determination means also takes into account the ranges of the internal state variable values as the avoidance condition when making a determination. Accordingly, the accuracy of determining whether the avoidance condition is satisfied can be further improved. The reason therefor is that, even when input values are similar to each other in a case in which the target code block is repeatedly executed, the internal state variable values may change as the target code block is executed and some internal state variable values may require inspection.

Figure 10:
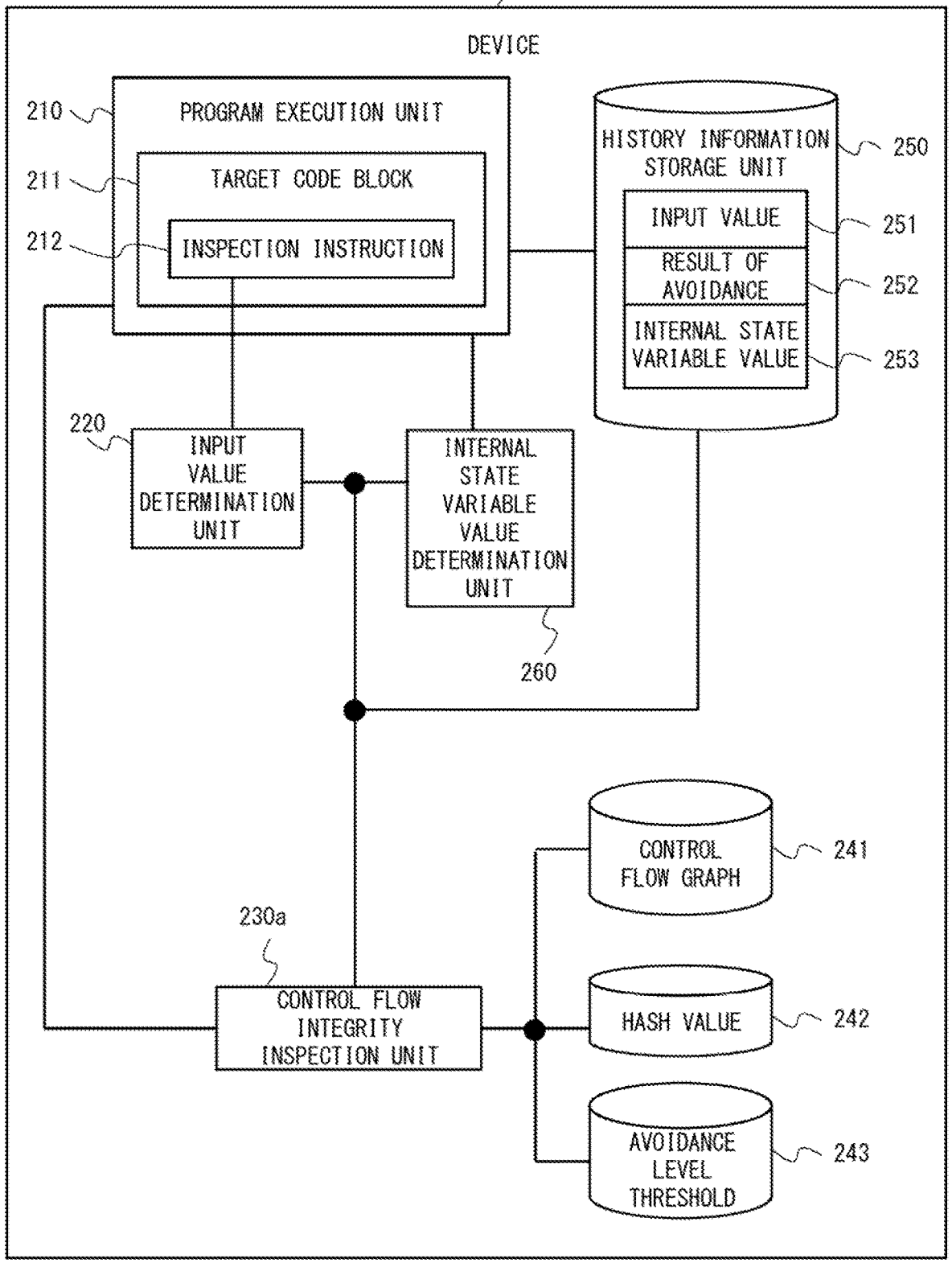
FIG. 10 is a block diagram showing a configuration of a device according to a third example embodiment.

FIG. 10 is a block diagram showing a configuration of a device 200*a* according to the third example embodiment. The device 200*a* is different from the aforementioned device 200 in that the control flow integrity inspection unit 230 is replaced by a control flow integrity inspection unit 230*a* and an internal state variable value determination unit 260 and an internal state variable value 253 are added to the components of the device 200. The other components are denoted by the same reference symbols and descriptions thereof will be omitted as appropriate.

The internal state variable value determination unit 260, which is a partial modification of the aforementioned input value determination unit 220, is a software process or a hardware circuit that determines the internal state variable values acquired in accordance with the calling from the inspection instruction 212 and notifies the control flow integrity inspection unit 230*a* of the result of the determination. In particular, the internal state variable value determination unit 260 takes into account the ranges of the internal state variable values as the avoidance condition when making the determination.

The internal state variable value 253, which is a variable value for holding the internal state of the target code block, is included in the history information and is stored in the history information storage unit 250.

The control flow integrity inspection unit 230*a* acquires each avoidance level as the result of the determination in each of the input value determination unit 220 and the internal state variable value determination unit 260. The control flow integrity inspection unit 230*a* performs inspection processing when one of these avoidance levels is 0 (or null). The control flow integrity inspection unit 230*a* performs avoidance determination processing in accordance with a lower avoidance level when both the avoidance levels are other than 0.

Figure 11:
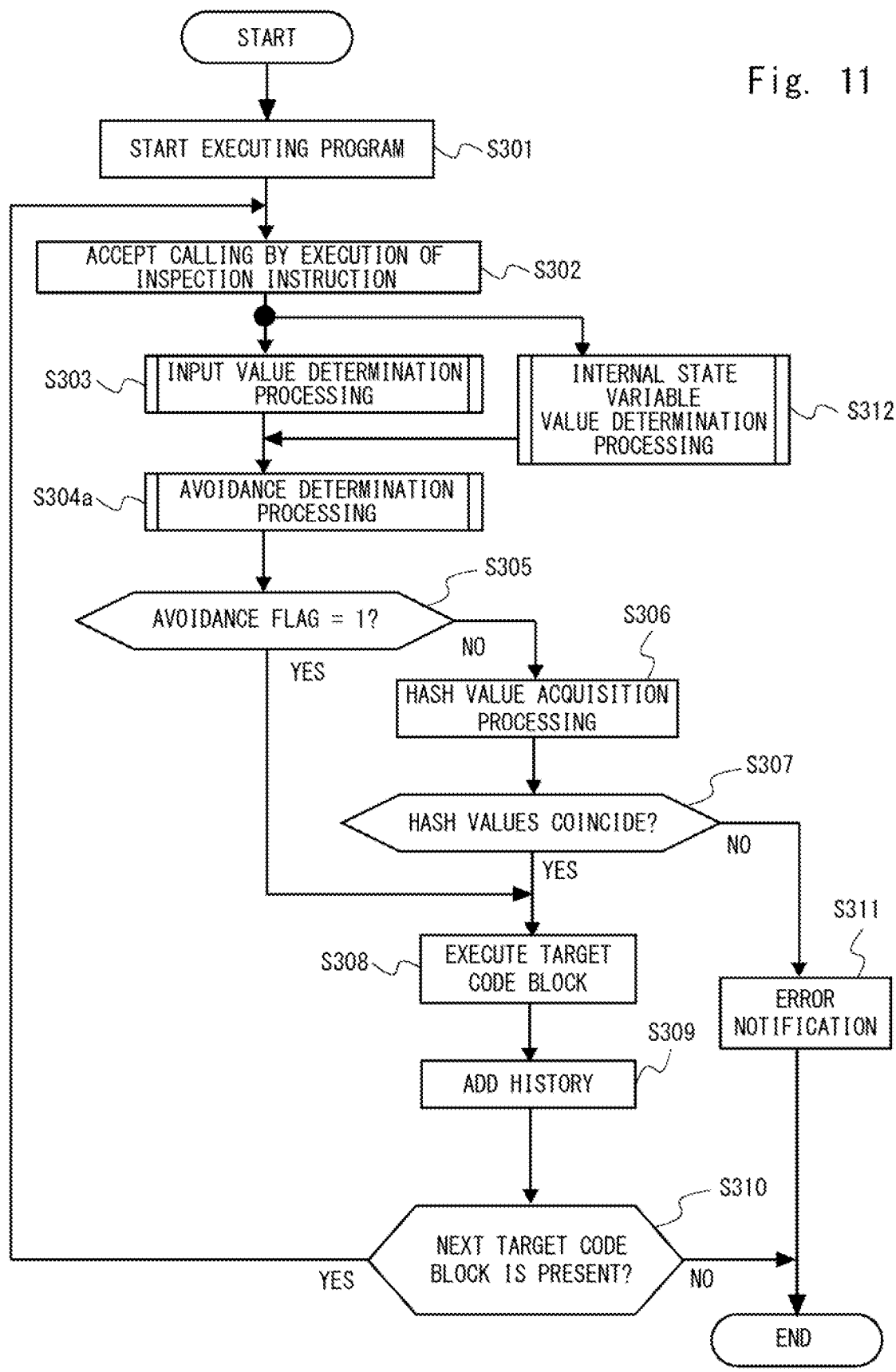
FIG. 11 is a flowchart showing a flow of a control flow inspection method according to the third example embodiment.

FIG. 11 is a flowchart showing a flow of a control flow inspection method according to the third example embodiment. In the following descriptions, the components that are similar to those in FIG. 6 will not be described. Further, the preliminary processing in FIG. 5 has already been executed, just like in the second example embodiment.

After Step S302, Step S303 is performed, and at the same time, the internal state variable value determination unit 260 performs internal state variable value determination processing (S312).

Figure 12:
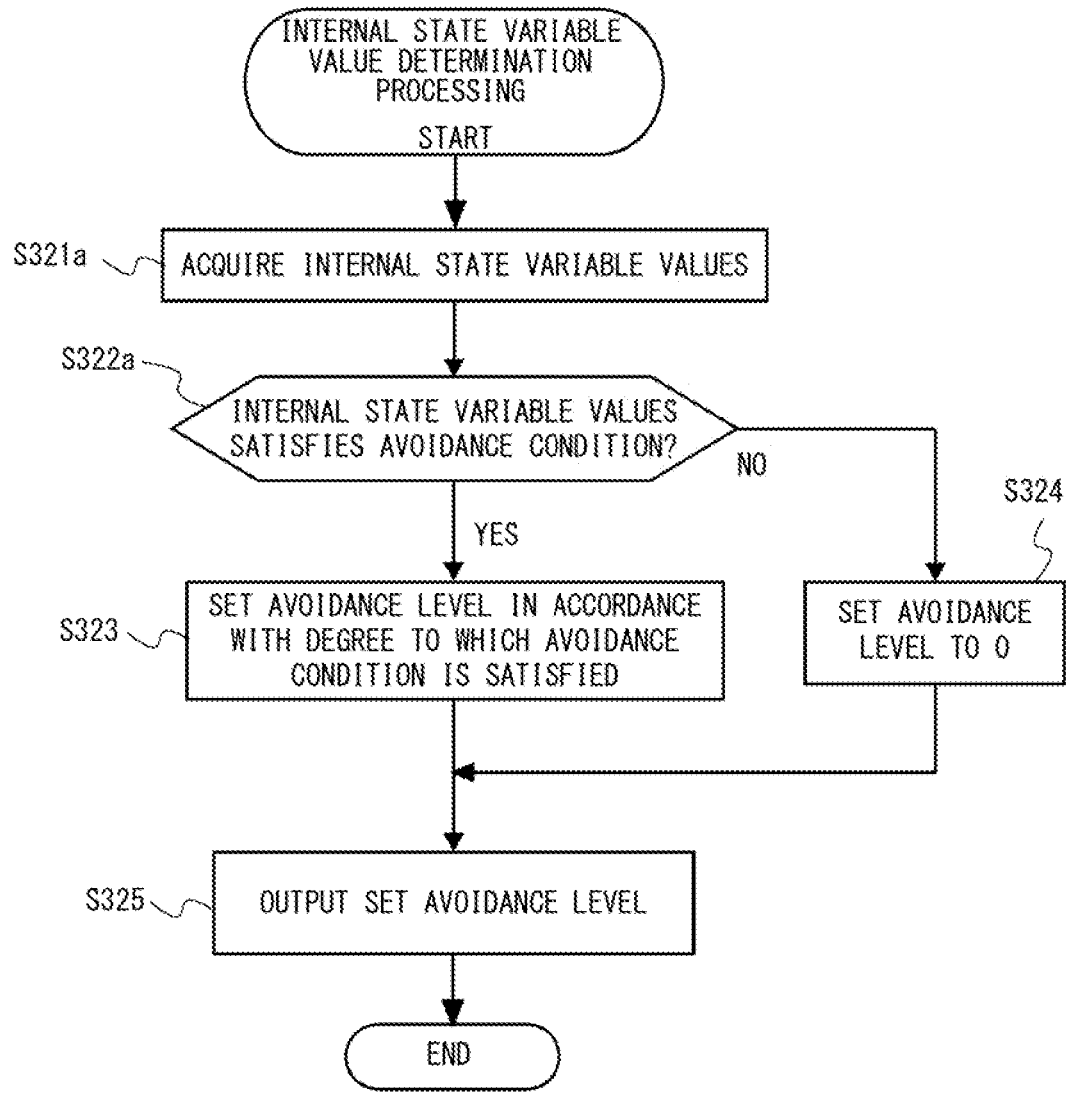
FIG. 12 is a flowchart showing a flow of internal state variable value determination processing according to the third example embodiment.

FIG. 12 is a flowchart showing a flow of internal state variable value determination processing according to the third example embodiment. First, the internal state variable value determination unit 260 acquires the internal state variable values when the target code block is executed (S321*a*). When, for example, the internal state variable value is set as the argument of the inspection instruction, the internal state variable value determination unit 260 acquires the internal state variable value from the argument of the inspection instruction. Further, when the internal state variable value is not set as the argument of the inspection instruction, the internal state variable value determination unit 260 may send an inquiry to the program execution unit 210, or acquire the internal state variable value 253 from the history information storage unit 250.

Next, the internal state variable value determination unit 260 determines whether the internal state variable values satisfy the avoidance condition (S322*a*). The avoidance condition is similar to that in Step S322.

The avoidance level in the internal state variable value is set in Step S323 or S324 in accordance with the result of the determination in Step S322a, and the set avoidance level is output to the control flow integrity inspection unit 230a (S325).

Referring once again to FIG. 11, the explanation will be continued. After Steps S303 and S312, the control flow integrity inspection unit 230a performs avoidance determination processing (S304a).

Figure 13:
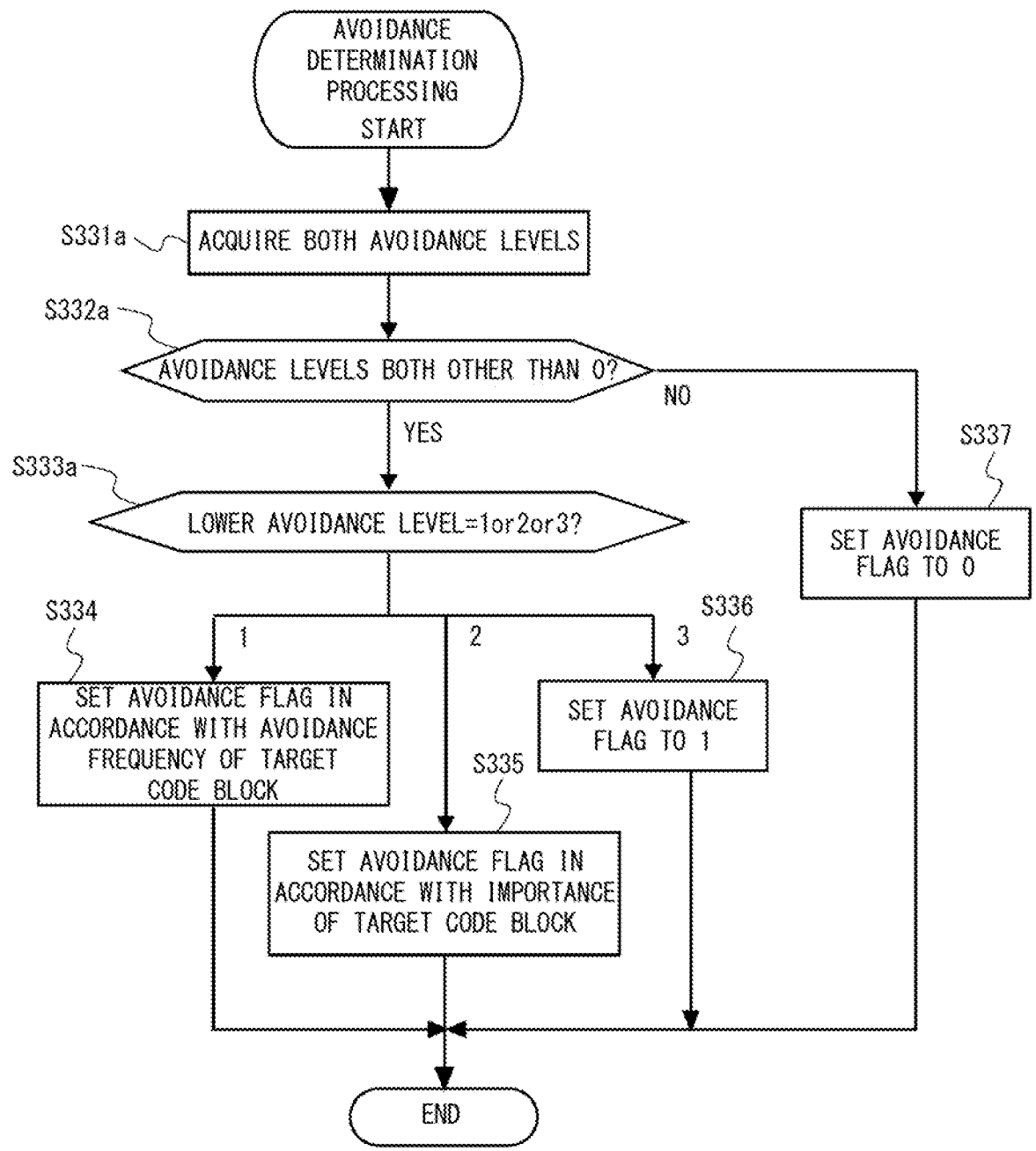
FIG. 13 is a flowchart showing a flow of avoidance determination processing according to the third example embodiment.

FIG. 13 is a flowchart showing a flow of avoidance determination processing according to the third example embodiment. First, the control flow integrity inspection unit 230a acquires the avoidance level from each of the input value determination unit 220 and the internal state variable value determination unit 260 (S331a). The control flow integrity inspection unit 230a acquires, for example, an avoidance level A from the input value determination unit 220 and acquires an avoidance level B from the internal state variable value determination unit 260.

Next, the control flow integrity inspection unit 230a determines whether the acquired avoidance levels are both other than 0 (S332a). When the avoidance levels A and B are both one of 1 to 3, the process proceeds to Step S333a. On the other hand, in a case in which the avoidance level A is one of 1 to 3 while the avoidance level B is 0, in a case in which the avoidance level B is one of 1 to 3 while the avoidance level A is 0, and in a case in which the avoidance levels A and B are both 0, the process proceeds to Step S337.

When the avoidance levels A and B are both one of 1 to 3, the control flow integrity inspection unit 230a determines whether one of the avoidance levels A and B which is lower than the other one is 1, 2, or 3 (S333a). If the avoidance levels A and B are the same, it is sufficient that one of them be determined. The following processes are similar to those in FIG. 8.

Referring once again to FIG. 11, the explanation will be continued. Steps S305 to S308, S310, and S311 are similar to those shown in FIG. 8. After Step S308, the input value determination unit 220 stores, besides the acquired input value 251 and the result of the avoidance 252 in the control flow integrity inspection unit 230, the acquired internal state variable value 253 in the history information storage unit 250. That is, the input value determination unit 220 adds the history (S309a). Accordingly, when the avoidance condition is determined regarding the target block next time, the internal state variable value determination unit 260 is able to acquire the internal state variable value 253 from the history information storage unit 250 and to further reduce the processing time.

Further, modifications similar to those made in the aforementioned second example embodiment may also be made in the third example embodiment.

Figure 14:
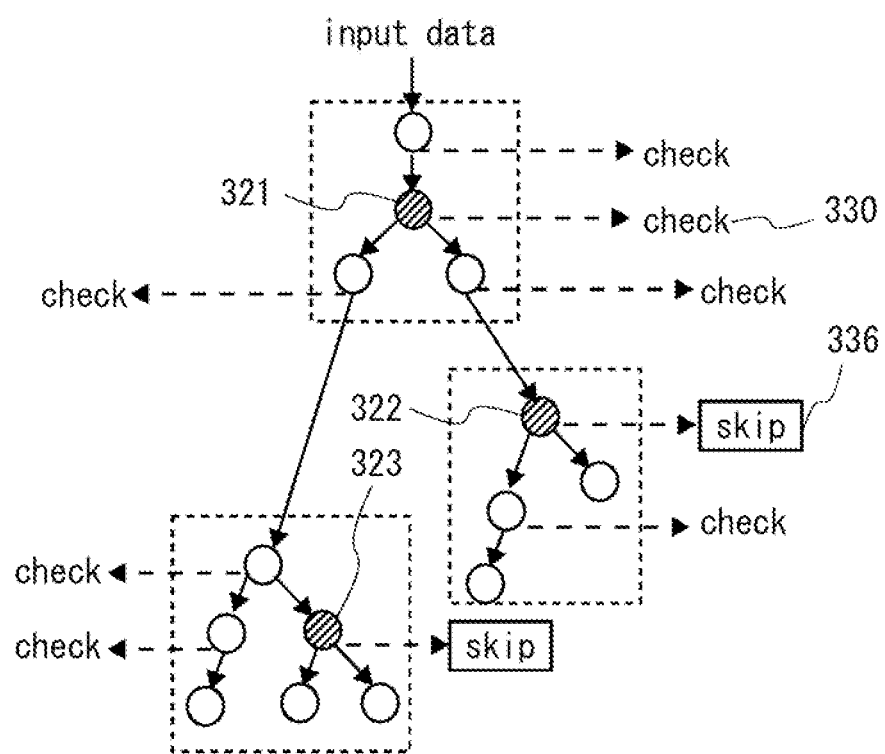
FIG. 14 is a diagram for describing the concept of avoidance of inspection processing of control flow integrity according to the third example embodiment.

FIG. 14 is a diagram for describing the concept of avoidance of inspection processing of the control flow integrity according to the third example embodiment. Not only an input value but also an internal state variable value is shared in the code blocks 321, 322, and 323. In this case, it shows that the hash value inspection processing 330 is executed in the code block 321 but is avoided in the following code blocks 322 and 323. It further shows that inspection is executed in the other parts since input values or internal state variable values do not satisfy the avoidance condition. As a matter of course, the parts where the processing is avoided and the number of avoidances are not limited to them.

Figure 15:
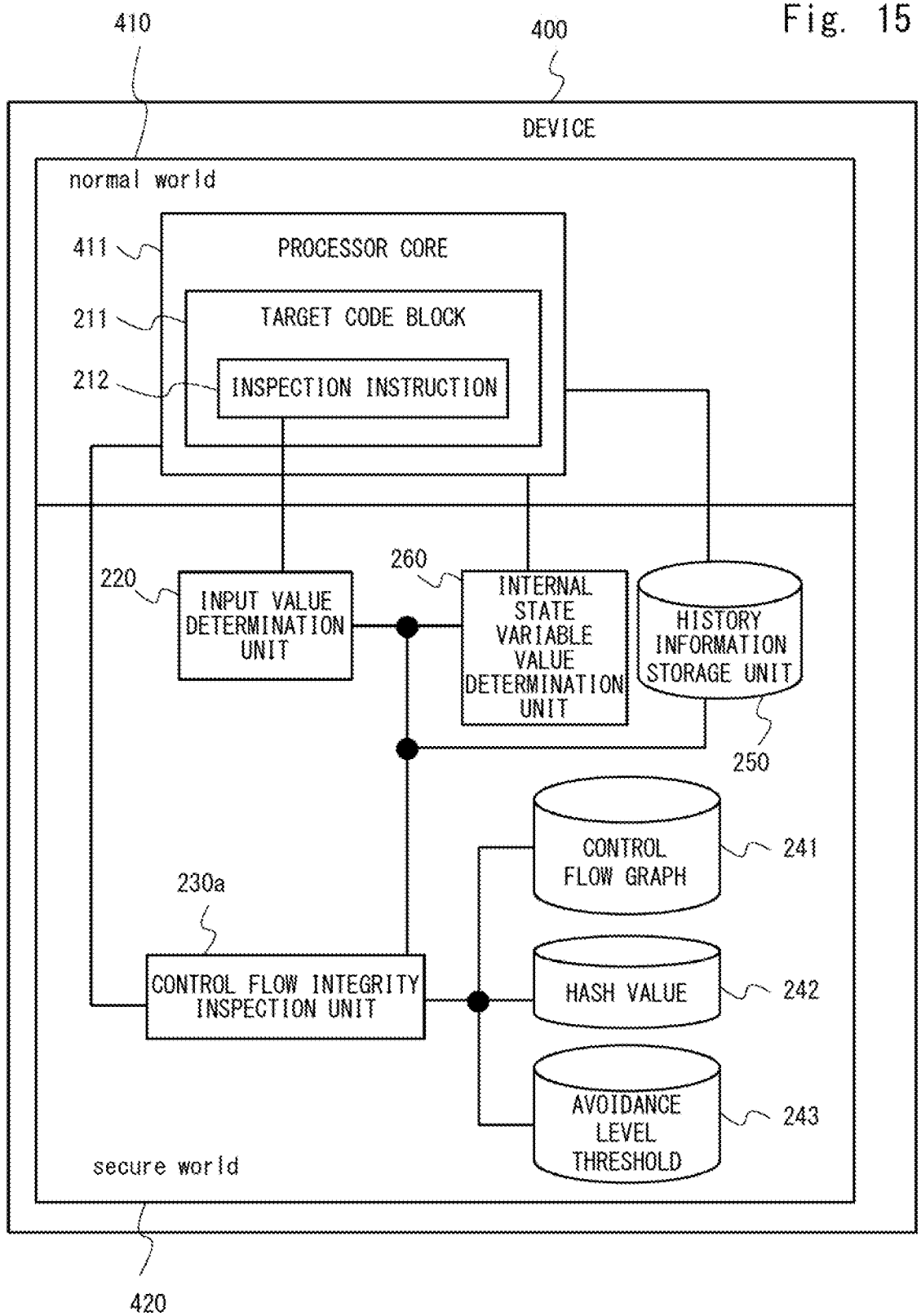
FIG. 15 is a block diagram showing a configuration of an example of a device according to the third example embodiment.

FIG. 15 is a block diagram showing a configuration of an example of the device 200a according to third example embodiment. A device 400, which is a specific example of the device 200a, is, for example, application of Trusted Execution Environment (TEE). The device 400 includes a normal world 410, which is a non-secure area, and a secure world 420, which is a secure area. The normal world 410 includes a processor core 411 as the program execution unit 210. It is assumed that the processor core 411 executes the target code block 211.

The secure world 420 includes the input value determination unit 220, the internal state variable value determination unit 260, the history information storage unit 250, the control flow integrity inspection unit 230a, the control flow graph 241, the hash value 242, and the avoidance level threshold 243 described above. It is sufficient that the secure world 420 at least include the input value determination unit 220, the internal state variable value determination unit 260, and the control flow integrity inspection unit 230a. The input value determination unit 220 and the internal state variable value determination unit 260 determine whether the avoidance condition of the inspection is satisfied in accordance with the execution of the inspection instruction for calling the inspection of the control flow integrity set in the target code block by the processor core 411. The secure world 420 is, for example, TrustedZone in an ARM (registered trademark) architecture.

Figure 16:
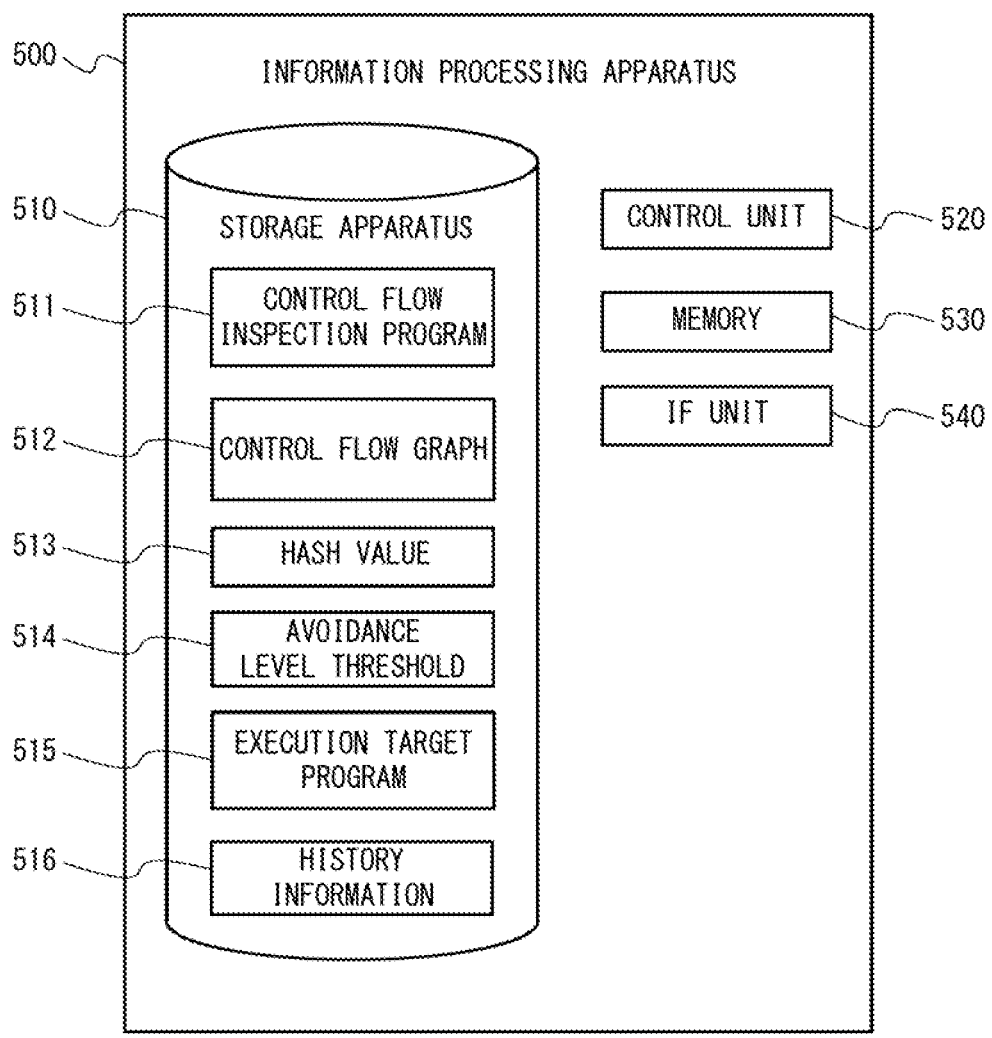
FIG. 16 is a block diagram showing a configuration of an example of an information processing apparatus according to the third example embodiment.

FIG. 16 is a block diagram showing a configuration of an example of an information processing apparatus 500 according to the third example embodiment. The information processing apparatus 500 includes a storage apparatus 510, a control unit 520, a memory 530, and an InterFace (IF) unit 540. The storage apparatus 510 is a non-volatile storage apparatus such as a hard disk or a flash memory. The storage apparatus 510 stores a control flow inspection program 511, a control flow graph 512, a hash value 513, an avoidance level threshold 514, an execution target program 515, and history information 516. The control flow inspection program 511 is a computer program in which processing of the control flow inspection method according to this example embodiment is implemented. The control flow graph 512, the hash value 513, and the avoidance level threshold 514 respectively correspond to the control flow graph 241, the hash value 242, and the avoidance level threshold 243. The execution target program 515, which corresponds to the predetermined program, includes a plurality of code blocks. The history information 516 corresponds to history information stored in the aforementioned history information storage unit 250.

The memory 530 is a storage area for temporarily holding information when the control unit 520 performs operation. The IF unit 540 is an interface that receives or outputs data from or to a device provided in the outside of the information processing apparatus 500. For example, the IF unit 540 outputs external input data to the control unit 520 and externally outputs data received from the control unit 520.

The control unit 520 is a processor that controls each of the components of the information processing apparatus 500, that is, a control apparatus. The control unit 520 may be, for example, one or more processor cores. The control unit 520 loads the control flow inspection program 511 into the memory 530 from the storage apparatus 510 and executes the control flow inspection program 511. Further, the control unit 520 loads the control flow graph 512, the hash value 513, the avoidance level threshold 514, and the history information 516 into the memory 530 as appropriate from the storage apparatus 510. Further, the control unit 520 loads the execution target program 515 into the memory 530 from the storage apparatus 510 and executes the loaded execution target program 515. Accordingly, the control unit 520 implements the functions of the program execution unit 210, the input value determination unit 220, the control flow integrity inspection unit 230a, the control flow graph 241, the hash value 242, the avoidance level threshold 243, the history information storage unit 250, and the internal state variable value determination unit 260. The control unit 520 is preferably a CPU that includes a Trusted Execution Environment (TEE). In this case, it can be said that the control flow inspection program 511 according to this example embodiment is executed on the CPU including the TEE.

Fourth Example Embodiment

A fourth example embodiment is a modified example of the aforementioned first to third example embodiments. The fourth example embodiment performs machine learning of determination models of avoidance conditions using various kinds of logs of a device, thereby improving the accuracy of the determination.

Figure 17:
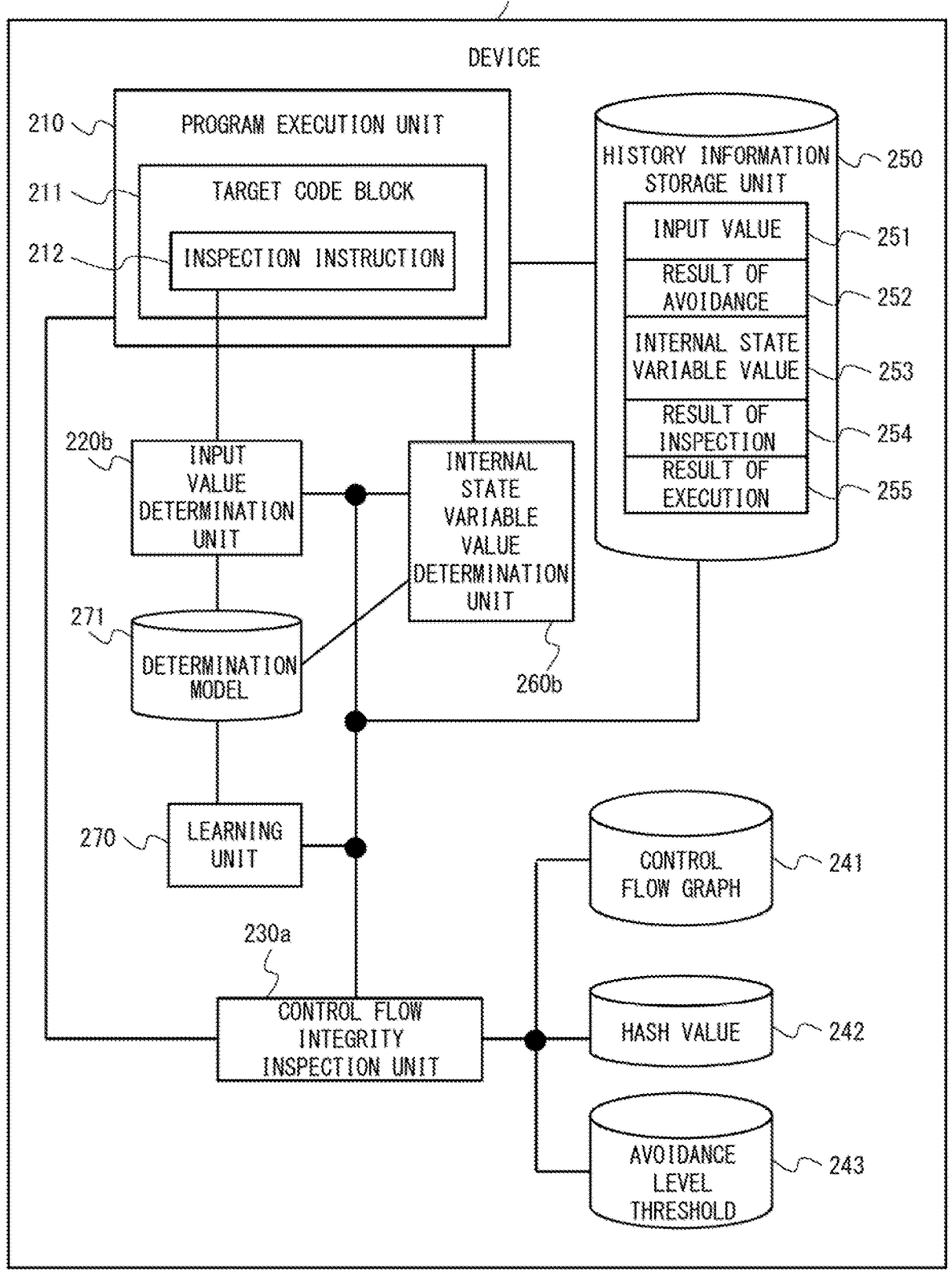
FIG. 17 is a block diagram showing a configuration of a device according to a fourth example embodiment.

FIG. 17 is a block diagram showing a configuration of a device 200b according to the fourth example embodiment. The device 200b is different from the above device 200a in that the input value determination unit 220 and the internal state variable value determination unit 260 are replaced by an input value determination unit 220b and an internal state variable value determination unit 260b and a learning unit 270, a determination model 271, a result of inspection 254, and a result of execution 255 are further added to the components of the device 200a. While the device 200b is a modified example of the third example embodiment, it may be a modified example of the first or second example embodiment.

The result of the inspection 254, which is the result of the inspection of the target code block by the control flow integrity inspection unit 230a, is stored in the history information storage unit 250. The result of the execution 255, which is the result of executing the target code block recognized by the inspection, is stored in the history information storage unit 250.

The determination model 271 is a program module or a model expression in which processing of receiving input values or internal state variable values, performing a predetermined operation using set parameters, and outputting the result of the operation as the avoidance level or the avoidance flag is implemented. That is, the determination model 271 may be two models, one for the input values and the other one for the internal state variable values. Alternatively, the determination model 271 may receive both the input values and the internal state variable values, perform a predetermined operation using set parameters, and output the result of the operation as the avoidance level or the avoidance flag. For example, the determination model 271 determines, using data items of the input values and the internal state variable values as elements of the input data, whether the avoidance condition is satisfied using predetermined parameters (weighting coefficients) for each of the input data items, and sets the avoidance level in accordance with the degree to which the avoidance condition is satisfied. The determination model 271 may be expressed by a neural network, a support vector machine or the like.

The learning unit 270 learns the determination model 271 using at least a part of the history information stored in the history information storage unit 250 as learning data. For example, the learning unit 270 performs machine learning of avoidance conditions or rules for setting the avoidance level using the learning data, and updates parameters of the determination model 271. This enables the determination model 271 to be updated to the latest state in real time. It is therefore possible to further maintain high security.

The input value determination unit 220b and the internal state variable value determination unit 260b make determinations using the determination model 271 in which avoidance conditions are learned using history information. One of the input value determination unit 220b and the internal state variable value determination unit 260b may use the determination model 271 and the other one of them may use a determination model similar to those in the other example embodiment. Alternatively, when the determination model 271 receives both the input values and the internal state variable values, the input value determination unit 220b and the internal state variable value determination unit 260b may be used as one determination unit and one avoidance level may be output to the control flow integrity inspection unit 230a. According to the above procedure, processing may be performed based on past inspection results, which allows the accuracy of determining the avoidance condition to be further improved.

Figure 18:
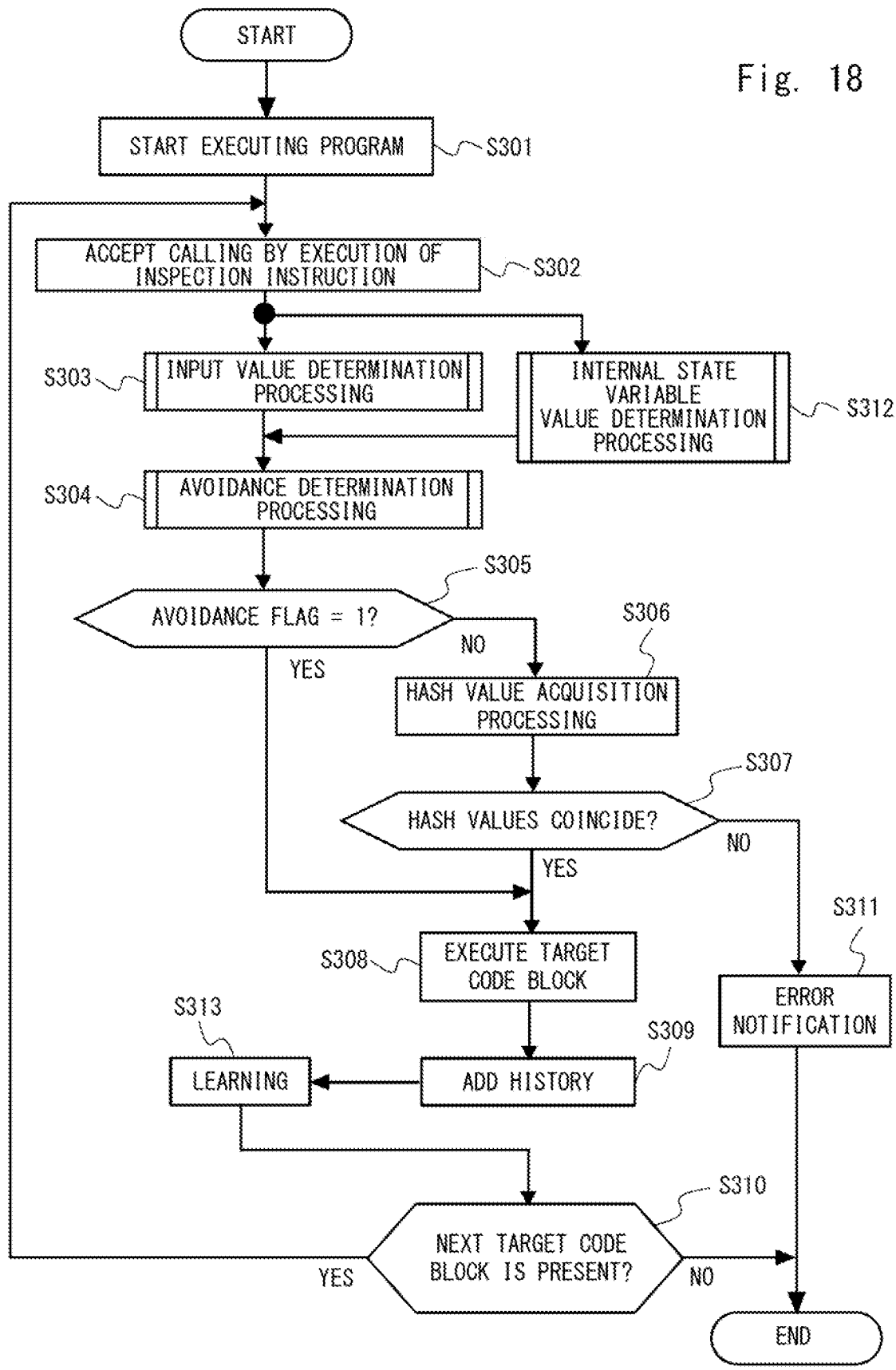
FIG. 18 is a flowchart showing a flow of a control flow inspection method including learning processing according to the fourth example embodiment.

FIG. 18 is a flowchart showing a flow of a control flow inspection method including learning processing according to the fourth example embodiment. In the following description, the components that are similar to those shown in FIG. 11 will not be described. Further, the preliminary processing shown in FIG. 5 has already been executed, just like in the third example embodiment. It is assumed that Step S322 in FIG. 7 and Step S322a in FIG. 12 use the determination model 271.

After Step S309, the learning unit 270 reads out history information from the history information storage unit 250 and performs machine learning of the avoidance condition of the determination model 271 and rules for setting the avoidance level as learning data (S313). For example, the learning unit 270 uses, as learning data, at least a part of the input value 251, the result of the avoidance 252, the internal state variable value 253, the result of the inspection 254, and the result of the execution 255. After that, the process proceeds to Step S310. The following processing is the same as that described above.

Note that the learning unit 270 may not be necessarily provided in this example embodiment. The learning unit 270 may be included in an external information processing apparatus and the learned determination model 271 may be stored in a storage apparatus in the device 200b.

Other Example Embodiments

In the above example embodiments, each of the components shown in the drawings as functional blocks which perform various kinds of processing can be configured by a Central Processing Unit (CPU), a memory, or another circuit in terms of hardware, and is achieved by a program or the like that the CPU loads into the memory and executes the loaded program in terms of software. Accordingly, it will be understood by those skilled in the art that these functional blocks can be implemented in various forms by only hardware, only software or a combination thereof. They are not limited to any one of them.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc-Read Only Memory (CD-ROM), CD-Recordable (CD-R), CD-ReWritable (CD-R/W), and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above example embodiments and may be changed as appropriate without departing from the spirit of the present disclosure. Further, the present disclosure may be executed by combining some of example embodiments as appropriate.

The whole or part of the example embodiments disclosed above can be described as, but not limited to, the following supplementary notes.

Supplementary Note A1

A semiconductor device comprising:
determination means for determining whether an avoidance condition of inspection of control flow integrity is satisfied based on determination auxiliary information in a target code block to be executed among a plurality of code blocks in a predetermined program; and
inspection means for avoiding the inspection of the control flow integrity in the target code block when it is determined that the avoidance condition is satisfied.

Supplementary Note A2

The semiconductor device according to Supplementary Note A1, wherein the determination means makes the determination using a degree of similarity with determination auxiliary information at a time of past execution in the target code block as the avoidance condition.

Supplementary Note A3

The semiconductor device according to Supplementary Note A1 or A2, wherein
the determination auxiliary information includes input values to the target code block, and
the determination means makes the determination using a data content of the input values or a range of a data size as the avoidance condition.

Supplementary Note A4

The semiconductor device according to Supplementary Note A3, wherein
the determination auxiliary information further includes internal state variable values when the target code block is executed, and
the determination means further takes into account the ranges of the internal state variable values as the avoidance condition when making the determination.

Supplementary Note A5

The semiconductor device according to any one of Supplementary Notes A1 to A4, wherein
the determination means sets an avoidance level in accordance with the degree to which the avoidance condition is satisfied when it makes the determination that the avoidance condition is satisfied, and
the inspection means avoids the inspection in accordance with the avoidance level.

Supplementary Note A6

The semiconductor device according to Supplementary Note A5, wherein
a threshold of the avoidance level is defined in advance in each of the plurality of code blocks, and
the inspection means avoids the inspection when the avoidance level set by the determination means satisfies the threshold of the avoidance level defined in the target code block.

Supplementary Note A7

The semiconductor device according to any one of Supplementary Notes A1 to A6, further comprising storage means for storing history information of the determination auxiliary information, wherein
the determination means:
acquires determination auxiliary information in the target code block;
makes the determination based on the history information and the acquired determination auxiliary information; and
adds the acquired determination auxiliary information in the storage means as the history information in accordance with the result of the avoidance by the inspection means.

Supplementary Note A8

The semiconductor device according to Supplementary Note A7, wherein the determination means makes the determination using a determination model in which the avoidance condition is learned using the history information.

Supplementary Note A9

The semiconductor device according to Supplementary Note A8, further comprising learning means for updating parameters by learning the avoidance condition of the determination model using the history information.

Supplementary Note A10

The semiconductor device according to any one of Supplementary Notes A1 to A9, wherein
the semiconductor device comprises a secure area and a non-secure area,
the secure area at least comprises the determination means and the inspection means,
the non-secure area comprises program execution means, and
the determination means makes the determination in accordance with execution of an inspection instruction for calling inspection of the control flow integrity set in the target code block by the program execution means.

Supplementary Note B1

A control flow inspection method, wherein
a computer:

makes a determination of whether an avoidance condition of inspection of control flow integrity is satisfied based on determination auxiliary information in a target code block to be executed among a plurality of code blocks in a predetermined program; and avoids inspection of the control flow integrity in the target code block when it is determined that the avoidance condition is satisfied.

Supplementary Note C1

A non-transitory computer readable medium storing a control flow inspection program for causing a computer to execute:

processing of determining whether an avoidance condition of inspection of control flow integrity is satisfied based on determination auxiliary information in a target code block to be executed among a plurality of code blocks in a predetermined program; and processing of avoiding inspection of the control flow integrity in the target code block when it is determined that the avoidance condition is satisfied.

Supplementary Note D1

An electronic device comprising the semiconductor device according to any one of Supplementary Notes A1 to A10.

While the present application has been described with reference to the example embodiments (and the Example), the present application is not limited to the above example embodiments (and the Example). Various changes that those skilled in the art may understand within the scope of the present application can be made to the configurations and the details of the present application.

REFERENCE SIGNS LIST

100 Semiconductor Device
110 Determination Unit
120 Inspection Unit
200 Device
200a Device
200b Device
210 Program Execution Unit
211 Target Code Block
212 Inspection Instruction
220 Input Value Determination Unit
220b Input Value Determination Unit
230 Control Flow Integrity Inspection Unit
230a Control Flow Integrity Inspection Unit
241 Control Flow Graph
242 Hash Value
243 Avoidance Level Threshold
250 History Information Storage Unit
251 Input Value
252 Result of Avoidance
253 Internal State Variable Value
254 Result of Inspection
255 Result of Execution
260 Internal State Variable Value Determination Unit
260b Internal State Variable Value Determination Unit
270 Learning Unit
271 Determination Model
31 Module
32 Code Block
321 Code Block
322 Code Block
323 Code Block
33 Hash Value Inspection Processing
331 Avoidance
332 Avoidance
333 Avoidance
334 Avoidance
335 Avoidance
336 Avoidance
400 Device
410 Normal World
411 Processor Core
420 Secure World
500 Information Processing Apparatus
510 Storage Apparatus
511 Control Flow Inspection Program
512 Control Flow Graph
513 Hash Value
514 Avoidance Level Threshold
515 Execution Target Program
516 History Information
520 Control Unit
530 Memory
540 IF Unit

What is claimed is:

1. A semiconductor device comprising:
at least one memory configured to store instructions; and
at least one processor configured to execute the instructions to:
acquire, as determination auxiliary information, at least one input value to a target code block to be executed among a plurality of code blocks in a predetermined program;
determine whether an avoidance condition of inspection of control flow integrity is satisfied based on the at least one input value to the target code block, by checking whether a data content of the at least one input value matches a predetermined value or whether a data size of the at least one input value is within a predetermined range; in response to the determination indicating that the avoidance condition has been satisfied, not perform avoid the inspection of the control flow integrity in the target code block;
in response to the determination indicating that the avoidance condition has not been satisfied, perform the inspection of the control flow integrity in the target code block,
wherein not performing the inspection of the control flow integrity when the avoidance condition has been satisfied reduces processing overhead while maintaining security during execution of the predetermined program.

2. The semiconductor device according to claim 1, wherein the at least one processor is further configured to execute the instructions to
make the determination using a degree of similarity with previous determination auxiliary information at a time of past execution in the target code block as the avoidance condition.

3. The semiconductor device according to claim 1, wherein
the determination auxiliary information further includes at least one internal state variable value when the target code block is executed, and
the at least one processor is further configured to execute the instructions to take into account a range of the at least one internal state variable value as the avoidance condition when making the determination.

4. The semiconductor device according to claim 1, wherein the at least one processor is further configured to execute the instructions to
set an avoidance level in accordance with a degree to which the avoidance condition is satisfied when the determination indicates that the avoidance condition is satisfied, and
perform or not perform the inspection in accordance with the avoidance level.

5. The semiconductor device according to claim 4, wherein a threshold of the avoidance level is defined in advance in each of the plurality of code blocks, and
the at least one processor is further configured to execute the instructions to
perform or not perform the inspection when the avoidance level satisfies the threshold of the avoidance level defined in the target code block.

6. The semiconductor device according to claim 1, further comprising a storage apparatus configured to store history information of the determination auxiliary information, wherein
the at least one processor is further configured to execute the instructions to:
acquire the determination auxiliary information in the target code block;
make the determination based on the history information and the acquired determination auxiliary information; and
add the acquired determination auxiliary information in the storage apparatus as additional history information in accordance with the result of the determination.

7. The semiconductor device according to claim 6, wherein the at least one processor is further configured to execute the instructions to
make the determination using a determination model in which the avoidance condition is learned using the history information.

8. The semiconductor device according to claim 7, wherein the at least one processor is further configured to execute the instructions to
update parameters by learning the avoidance condition of the determination model using the history information.

9. The semiconductor device according to claim 1, wherein
the semiconductor device includes a secure area and a non-secure area,
the secure area includes at least the at least one memory, a determination circuit and an inspection circuit,
the non-secure area includes the at least one processor, and
the determination circuit is configured to make the determination in accordance with execution of an inspection instruction for calling inspection of the control flow integrity set in the target code block by the at least one processor.

10. A control flow inspection method, comprising:
acquiring, by a computer and as determination auxiliary information, at least one input value to a target code block to be executed among a plurality of code blocks in a predetermined program;
a determining, by the computer, of whether an avoidance condition of inspection of control flow integrity is satisfied based on the at least one input value to the target code block, by checking whether a data content of the at least one input value matches a predetermined value or whether a data size of the at least one input value is within a predetermined range;
in response to the determination indicating that the avoidance condition has been satisfied, not performing, by the computer, the inspection of the control flow integrity in the target code block;
in response to the determination indicating that the avoidance condition has not been satisfied, performing, by the computer, the inspection of the control flow integrity in the target code block,
wherein not performing the inspection of the control flow integrity when the avoidance condition has been satisfied reduces processing overhead while maintaining security during execution of the predetermined program.

11. A non-transitory computer readable medium storing a control flow inspection program executable by a computer to perform:
acquiring, as determination auxiliary information, at least one input value to a target code block to be executed among a plurality of code blocks in a predetermined program;
determining whether an avoidance condition of inspection of control flow integrity is satisfied based on the at least one input value to the target code block, by checking whether a data content of the at least one input value matches a predetermined value or whether a data size of the at least one input value is within a predetermined range;
in response to the determination indicating that the avoidance condition has been satisfied, not performing the avoid the inspection of the control flow integrity in the target code block;
in response to the determination indicating that the avoidance condition has not been satisfied, performing the inspection of the control flow integrity in the target code block,
wherein not performing the inspection of the control flow integrity when the avoidance condition has been satisfied reduces processing overhead while maintaining security during execution of the predetermined program.

12. An electronic device comprising a semiconductor device,
wherein the semiconductor device comprises:
at least one memory configured to store instructions; and
at least one processor configured to execute the instructions to:
acquire, as determination auxiliary information, at least one input value to a target code block to be executed among a plurality of code blocks in a predetermined program;
determine whether an avoidance condition of inspection of control flow integrity is satisfied based on the at least one input value to the target code block, by checking whether a data content of the at least one input value matches a predetermined value or whether a data size of the at least one input value is within a predetermined range;
in response to the determination indicating that the avoidance condition has been satisfied, not perform the inspection of the control flow integrity in the target code block; in response to the determination indicating that the avoidance condition has not been satisfied, perform the inspection of the control flow integrity in the target code block, wherein not performing the inspection of the control flow integrity when the avoidance condition has been satisfied reduces processing overhead while maintaining security during execution of the predetermined program.

* * * * *